US012301342B2

(12) United States Patent
Thiessen et al.

(10) Patent No.: US 12,301,342 B2
(45) Date of Patent: May 13, 2025

(54) DETACHABLE DRONE HIJACKER AND/OR JAMMER METHOD, APPARATUS AND SYSTEM

(71) Applicant: THE UNITED STATES OF AMERICA, AS REPRESENTED BY THE SECRETARY OF THE NAVY, Arlington, VA (US)

(72) Inventors: Christian Michael Thiessen, Monterey, CA (US); Britta Hale, Monterey, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 176 days.

(21) Appl. No.: 18/114,555

(22) Filed: Feb. 27, 2023

(65) Prior Publication Data

US 2024/0380511 A1 Nov. 14, 2024

Related U.S. Application Data

(60) Provisional application No. 63/314,371, filed on Feb. 26, 2022.

(51) Int. Cl.
*H04K 3/00* (2006.01)

(52) U.S. Cl.
CPC ......... *H04K 3/825* (2013.01); *H04K 2203/22* (2013.01); *H04K 2203/32* (2013.01); *H04K 2203/34* (2013.01)

(58) Field of Classification Search
CPC ...................................................... H04K 3/825
See application file for complete search history.

(56) References Cited

U.S. PATENT DOCUMENTS

| | | | | |
|---|---|---|---|---|
| 11,716,166 B2 * | 8/2023 | Morrow | G08B 7/06 455/1 |
| 2014/0206279 A1 * | 7/2014 | Immendorf | H04K 3/42 455/1 |
| 2015/0229434 A1 * | 8/2015 | Shawn | G01S 13/74 342/14 |
| 2018/0254848 A1 * | 9/2018 | Morrow | H04K 3/825 |
| 2020/0374028 A1 * | 11/2020 | Welsh | H05K 1/024 |
| 2022/0180759 A1 * | 6/2022 | Kang | G01S 13/72 |

* cited by examiner

*Primary Examiner* — David Bilodeau
(74) *Attorney, Agent, or Firm* — Scott Bell; Heber Martin Carbajal Chavez

(57) ABSTRACT

A method, apparatus and system for countering unmanned aerial systems (UAS). More specifically, this disclosure, and the exemplary embodiments described herein, provide portable detachable/attachable drone hijackers/jammers and systems meant to act as a stand-in electronic warfare device that can be configured and attached to another unmanned device. According to an exemplary embodiment, the disclosed method, apparatus and system targets adversarial UAVs by leveraging their protocol vulnerabilities and attacking their communication links between a target and its ground control station (GCS), or other communication links to other devices (such as GNSS and other UAVs). Its detachable nature gives the Detachable Drone Hijacker a stand-in capability where it can exist amongst its targets and deliver air-to-air attacks.

22 Claims, 16 Drawing Sheets
(3 of 16 Drawing Sheet(s) Filed in Color)

DETACHABLE DRONE HIJACKER AND/OR JAMMER METHOD, APPARATUS AND SYSTEM

CROSS REFERENCE TO RELATED PATENT(S) AND APPLICATION(S)

This application claims the benefit of U.S. Provisional Application No. 63/314,371 filed Feb. 26, 2022, and entitled Detachable Drone Hijacker, which is hereby incorporated in its entirety by reference.

BACKGROUND

This disclosure, and the exemplary embodiments described herein, describe methods, apparatus, and systems for countering unmanned vehicles, for example aerial systems (UAS). More specifically, according to an exemplary embodiment of this disclosure, described is are portable detachable/attachable drone hijackers/jammers and systems meant to act as a stand-in electronic warfare device that can be configured and attached to another unmanned device. The implementation described herein is related to systems and methods for implementation in an unmanned drone, however it is to be understood that the scope of this disclosure is not limited to such application.

Over the past decade commercial drone technology has become more available and drastically decreased in price as the capability of the unmanned devices has become more sophisticated. The UAS countermeasures industry has expanded drastically with a focus on kinetic and non-kinetic electronic warfare devices meant to mitigate the threat posed by adversarial use of unmanned aircraft.

In 2019, after a sampling study of 537 C-UAS devices by the Bard College Center for the Drone [Ref. 1], there were no C-UAS devices designed to be a detachable system that targets the communications and control links of a target UAV via an air-to-air attack method. The closest design is the Leer-3, built by JSC Concern Radio-Electronic Technologies, which is a holding company within the Russian state-owned Rostec group that specializes in defense and electronics technologies [Ref. 2]. The Leer-3 incorporates its electronic warfare capability into a singular aerial platform, meaning the C-UAS functionality and aerial platform are designed as one unit and not separable (i.e., C-UAS functionality cannot be detached or used on a different platform).

American companies such as Anduril Industries and CACI use radio frequency mitigation measures such as broadband noise jamming. However, the devices built by these companies are terrestrial systems that use multi-sensor technologies integrated as a part of a larger system. The ANDURIL SENTRY TOWER and CACI CORIAN [Ref. 3] are effective at broadband noise jamming, however their large size and high power requirements place them in the category of stand-off jammers. The Sierra Nevada Corporation in conjunction with Lockheed Martin, RPS-42, and Oshkosh partnered with the Marine Corps to develop the Marine Air Defense Integrated System (MADIS), a capability acquired to defeat adversarial UAS and other low-flying aircraft. The MADIS is a mobile ground-based air defense system that is mounted on a light vehicle for increased all-terrain mobility. Anduril Industries recently developed a kinetic C-UAS device called the ANVIL, which seeks to intercept a target device by ramming it out of the sky [Ref. 4]. Lastly, DEDRONE'S DRONEDEFENDER is a lightweight and mobile ground-based jammer which uses a broadband noise jamming technique to sever the link between a drone and its ground control station [Ref. 5].

The current suite of C-UAS devices is primarily ground-based and are intended to serve as standoff jamming devices. Those that are designed to be air-to-air devices focus on kinetic countermeasures to ram or shoot an adversarial target out of the sky.

INCORPORATION BY REFERENCE

The following publications are incorporated by reference in their entirety.

[Ref. 1] A. H. Michel, "Counter-Drone Systems, 2nd Edition," Center for the Study of the Drone, Bard College, Annandale-on-Hudson, NY, December 2019. Accessed: Jul. 6, 2021.

[Ref. 2] J. Kjellen, "Russian Electronic Warfare—The role of Electronic Warfare in the Russian Armed Forces," Försvarsdepartementet/Ministry of Defence, Stockholm, Sweden, FOI-R—4625-SE, September 2018.

[Ref. 6] M. Dillinger, M. Kambiz, and N. Alonistioti, *Software defined radio: architectures, systems, and functions*. Hoboken, NJ: Wiley, 2003.

[Ref. 7] B. A. Cheikes, D. Waltermire, and K. Scarfone, "Common Platform Enumeration: Naming Specification Version 2.3," National Institute of Standards and Technology, Gaithersburg, MD, NIST Interagency Report NIST IR 7695 August 2011.

[Ref. 8] J. Wunder, A. Halbardier, and D. Waltermire, "Specification for asset identification 1.1," National Institute of Standards and Technology, Gaithersburg, MD, NIST Interagency Report NIST IR 7693 June 2011.

[Ref. 9] M. Nieles, K. Dempsey, and V. Y. Pillitteri, "An Introduction to Information Security," National Institute of Standards and Technology, Gaithersburg, MD, NIST Special Publication NIST SP 800-12r1, June 2017.

[Ref. 10] D. L. Adamy, "Ch 5: EW Against Communications Signals," in *EW* 102*: A Second Course in Electronic Warfare*, Boston, MA: Horizon House Publications, Inc., 2004, pp. 107-154.

[Ref. 11] Thiessen, Christian M., Redesigning The Counter Unmanned Systems Architecture, Master Thesis Naval Postgraduate School (U.S.) Monterey, California: Naval Postgraduate School, 2001 Apr. 24.

[Ref. 12] B. Barrett, "The Marines' New Drone-Killer Aces Its First Test," Wired, July 2019.

[Ref. 13] R. Poisel, Modern Communication Jamming Principles and Techniques, Second. Norwood, MA: Artech House, Inc., 2011.

Additional Listing of References Cited and Not Incorporated by Reference

[Ref. 3] "SkyTracker® Technology Suite," caci.com, 2021.

[Ref. 4] "Anduril—Our Work." anduril.com (accessed Nov. 13, 2021).

[Ref. 5] "Data Sheet—DroneDefender Counter-UAS Device." Dedrone.gdmissionsystems.com.

BRIEF DESCRIPTION

In accordance with one exemplary embodiment of the present disclosure, disclosed is a portable detachable drone hijacker operatively associated with a friendly unmanned vehicle, the detachable drone hijacker comprising: a mount to attach and detach the detachable drone hijacker to a friendly unmanned vehicle, the mount adapted to attach and detach to the associated unmanned vehicle; a receiving antenna to receive an instruction set for attacking a target drone and a signal of interest associated with the target drone; a transmitting antenna to transmit attack signals at the target drone; a software defined radio to generate the attack signals that are compatible with the target drone; and a processor to control the software defined radio and the transmitting antenna to attack the target drone according to the instruction set, wherein the detachable drone hijacker is a discrete device mounted to the associated friendly unmanned vehicle and the detachable drone hijacker is completely operationally independent from the operation of the friendly unmanned vehicle and any associated electronics to operate the unmanned vehicle.

In accordance with another exemplary embodiment of the present disclosure, disclosed is a portable detachable drone jammer operatively associated with a friendly unmanned vehicle, the detachable drone jammer comprising: a mount to attach and detach the detachable drone jammer to a friendly unmanned vehicle, the mount adapted to attach and detach to the associated unmanned vehicle; a receiving antenna to receive an instruction set for attacking a target drone and radio frequency links of interest associated with the target drone; a transmitting antenna to transmit attack signals at the target drone; a software defined radio to generate the attack signals that are compatible with the target drone; and a processor to control the software defined radio and the transmitting antenna to attack the radio frequency links used by the target drone according to the instruction set, wherein the detachable drone jammer is a discrete device mounted to the associated friendly unmanned vehicle and the detachable drone jammer is completely operationally independent from the operation of the friendly unmanned vehicle and any associated electronics to operate the unmanned vehicle.

In accordance with another exemplary embodiment of the present disclosure, disclosed is A drone hijacker system operatively associated with attacking unmanned target vehicles, the drone hijacker system comprising: a ground control station including one or more base antennas; and a plurality of portable detachable drone hijackers operatively associated with a plurality of respective friendly unmanned vehicle, each detachable drone hijacker comprising: a mount to attach and detach the drone hijacker to the respective friendly unmanned vehicle, the mount adapted to attach and detach to the associated unmanned vehicle; a receiving antenna to receive an instruction set from the ground control station for attacking the unmanned target vehicle and a signal of interest associated with the unmanned target vehicle drone; a transmitting antenna to transmit attack signals at the unmanned target vehicle; a software defined radio to generate the attack signals that are compatible with the unmanned target vehicle; and a processor to control the software defined radio and the transmitting antenna to attack the unmanned target vehicle according to the instruction set, wherein the detachable drone hijacker is a discrete device mounted on to the associated friendly unmanned vehicle and the detachable drone hijacker is completely operationally independent from the operation of the friendly unmanned vehicle and any associated electronics to operate the unmanned vehicle.

In accordance with another exemplary embodiment of the present disclosure, disclosed is. A drone jammer system operatively associated with attacking unmanned target vehicles, the drone jammer system comprising: a ground control station including one or more base antennas; and a plurality of portable detachable drone jammers operatively associated with a plurality of respective friendly unmanned vehicle, each detachable drone jammer comprising: a mount to attach and detach the detachable drone jammer to a respective friendly unmanned vehicle, the mount adapted to attach and detach to the associated unmanned vehicle; a receiving antenna to receive an instruction set for attacking an unmanned target vehicle and radio frequency links of interest associated with the unmanned target vehicle; a transmitting antenna to transmit attack signals at the unmanned target vehicle; a software defined radio to generate the attack signals that are compatible with the unmanned target vehicle; and a processor to control the software defined radio and the transmitting antenna to attack the radio frequency links used by the unmanned target vehicle according to the instruction set, wherein the detachable drone jammer is a discrete device mounted on the associated friendly unmanned vehicle and the detachable drone jammer is completely operationally independent from the operation of the friendly unmanned vehicle and any associated electronics to operate the unmanned vehicle.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure, reference is now made to the following descriptions taken in conjunction with the accompanying drawings.

FIG. 12A is a front view of a mounting bracket 401, FIG. 12B is a rear view the mounting bracket 401 and FIG. 12C is a top view of a hook-n-loop mounting arrangement 402.

DETAILED DESCRIPTION

Figure 1:
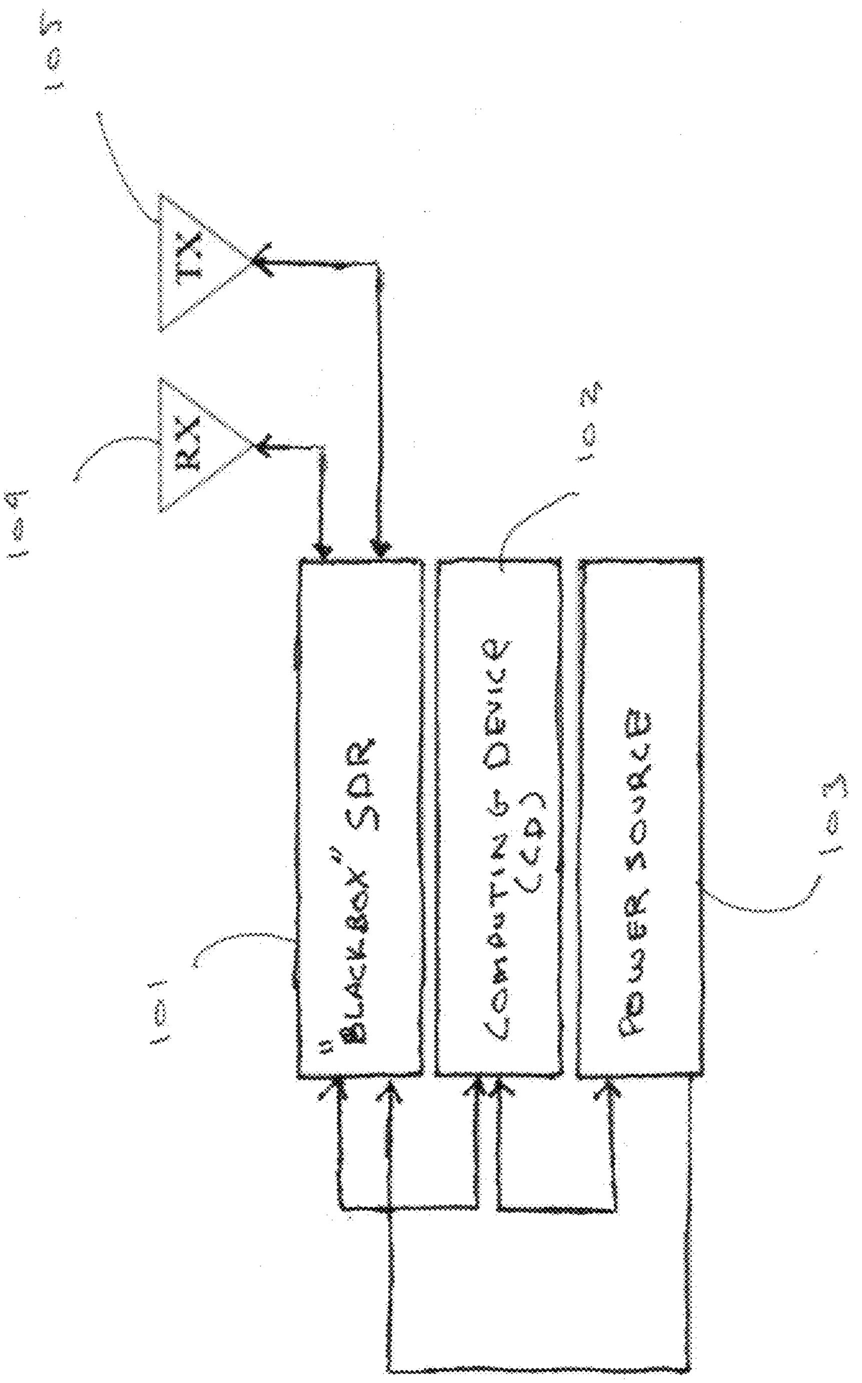
FIG. 1 is a schematic of a Detachable Drone Hijacker/Jammer and its hardware components according to an exemplary embodiment of this disclosure, including a software defined radio 101 [Ref. 6], a computing device 102 [Ref. 7] [Ref. 8], a power source 103, and antennas 104; 105 all interconnected and configured to ensure accuracy of an attack method while providing optimal system performance of the device that is hosting the Detachable Drone Jammer.

This disclosure and exemplary embodiments described herein provide a Detachable Drone Hijacker which is detachable, lightweight, and low-power consuming device that targets unmanned aerial vehicles (UAV) which have been deemed to be adversarial. It targets adversarial UAVs by leveraging the protocol vulnerabilities and attacking the communication links between a target and its ground control station (GCS), or other communication links to other devices (such as GNSS and other UAVs). Its detachable nature gives the Detachable Drone Hijacker a stand-in capability where it can exist amongst its targets and deliver air-to-air attacks.

Features associated with the Detachable Drone Hijacker include: Detachable, Lightweight, Portable, and Low power consuming. Because the Detachable Drone Hijacker is an attachment, it may be connected by clip- or bolt-on functionality for configuration to fit the needs of its host device. The Detachable Drone Hijacker consists of a power source, software defined radio, computing device, and an antenna configuration. The antenna configuration can be designed to work as an omnidirectional or directional antenna and includes a receiving and transmitting antenna.

The Detachable Drone Hijacker exploits vulnerabilities in communication protocol design and can conduct various cyber-attacks, for example including but not limited to, Global Navigation Satellite System (GNSS) spoofing, user datagram protocol (UDP) flood attacks, other protocol denial-of-service (DOS) attacks, protocol deauthentication attacks, controller communication link eavesdropping, and/or telemetry link spoofing or hijacking.

The Detachable Drone Hijacker is an attachment that can serve as a stand-in device capable of air-to-air counter-unmanned aircraft system (C-UAS) against one or more target UAVs, and the Detachable Drone Hijacker may target devices that use frequency hopping spread spectrum (FHSS) and/or direct sequence spread spectrum (DSSS) modulation schemes.

The Detachable Drone Hijacker includes a power source 103, software defined radio 101 [Ref. 6], computing device 102 [Ref. 7], [Ref. 8], and an antenna configuration 104; 105. The antenna configuration can be designed to work as an omnidirectional or directional antenna and includes a receiving 104 and transmitting antenna 105. The Detachable Drone Hijacker exploits vulnerabilities in communication protocol design and can conduct various cyber-attacks, for example including, but not limited to, Denial of Service (DOS) attacks [Ref. 9], Global Navigation Satellite System (GNSS) spoofing, controller communication link eavesdropping, and/or telemetry link hijacking. It may also be capable of exploiting communication protocol vulnerabilities.

The Detachable Drone Hijacker is a portable and lightweight device that can be attached to a manned or unmanned platform with the intent of disrupting or impersonating the communications link between a target drone and its controlling device. According to an exemplary embodiment of this disclosure, the Detachable Drone Hijacker executes its attack methods based on a library of information that is compiled to give it a range of attack options that will be the most effective, while remaining power efficient. The Detachable Drone Hijacker's key features are its low energy requirements, light weight, and variable antenna configurations which yield multiple stand-in hacking options [Ref. 10]. These attack methods extend beyond traditional noise jamming techniques used in many electronic warfare devices and can include, but are not limited to, Global Navigation Satellite System (GNSS) spoofing to the hijacking of two-way controller-to-UAV communications traffic, or inter-device coordination protocols to disrupt swarming.

The Detachable Drone Hijacker is distinguishable from other aerial electronic warfare and cyber-attack platforms in that it is designed to be a detachable and modular payload that can be configured to fit the needs of its host device. The hardware and software of the Detachable Drone Hijacker can be configured to fit the needs of the host device, whether that be a UAV, an unmanned ground vehicle, a waterborne unmanned surface vessel, or an unmanned underwater vehicle.

The Detachable Drone Hijacker is an attachable device that can clip-on or bolt-on to another platform which allows it to be used as a stand-in hacking device that can coexist amongst its targets. This stand-in aspect limits the unintentional damage to other devices in the area unlike a standoff device which may unintentionally degrade or disrupt the communications of adjacent devices. This implies a great amount of customizability, in that the device may be attached to various UAS or other vessels.

The cyberattack focus of the Detachable Drone Hijacker allows it to be small, lightweight, and have low power consumption, while targeting various frequencies, modulation schemes, as well as the open source and proprietary communication protocols of government and commercial drones, including drone swarms. This includes devices that use FHSS and/or DSSS digital modulation schemes as well as devices that use e.g. IEEE 802.11 wireless communication protocols and proprietary security protocols.

The detachable drone hijacker can be operated as a standalone device or linked to a ground, air, space, waterborne surface, or subsurface control system. Thus, it can integrate with other platforms and is not required to be purchased as a signal full system solution. This link allows the Detachable Drone Hijacker to receive updated instructions and target information as the operating environment changes.

Figure 2:
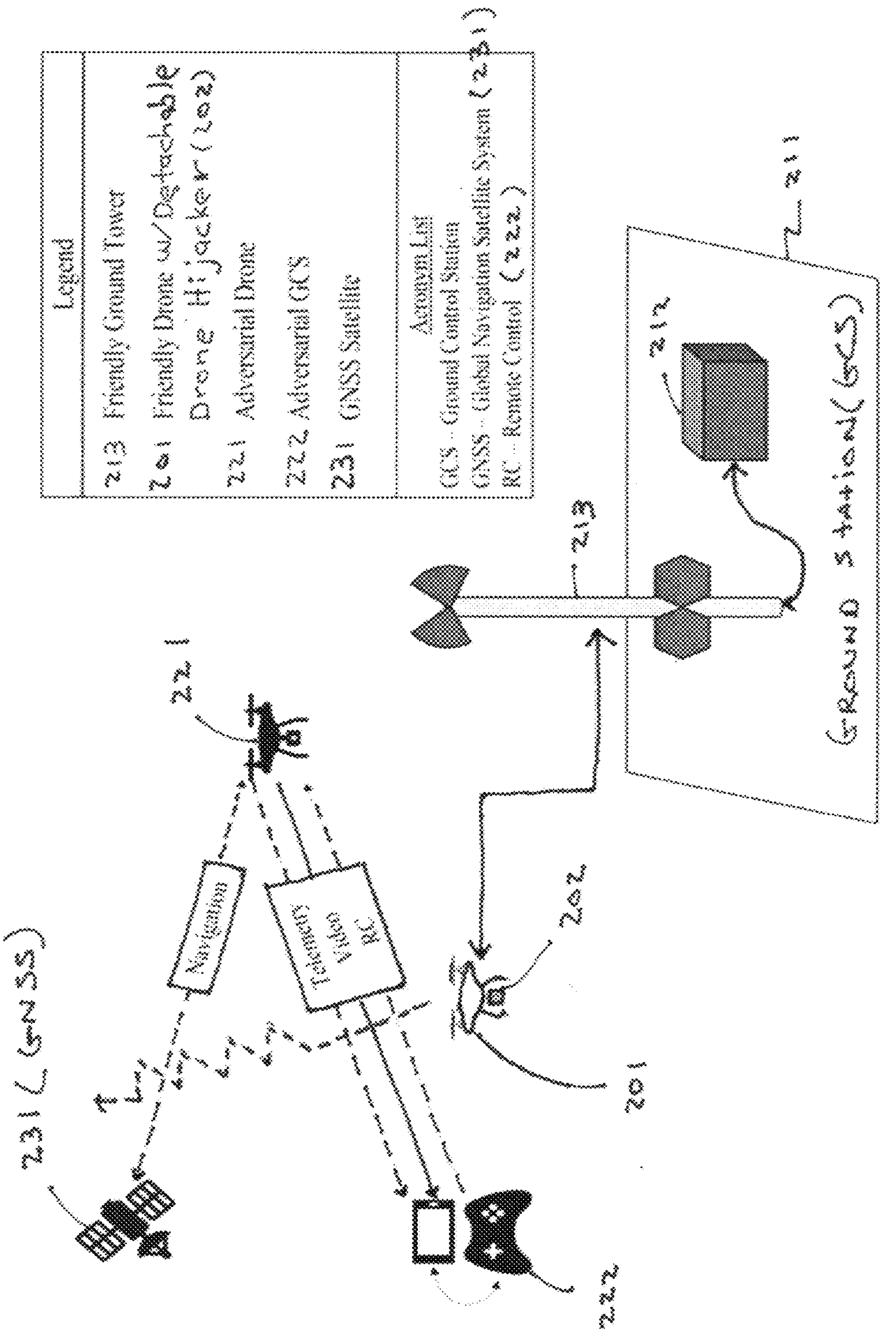
FIG. 2 is a schematic of an example use case scenario where a Detachable Drone Hijacker 202 is used to intercept an adversarial drone 221.

With reference to FIG. 2 shown is a schematic of an example use case scenario where a Detachable Drone Hijacker is used to intercept an adversarial drone.

FIG. 2 depicts a scenario where the Detachable Drone Hijacker 201; 202 is dispatched by its ground station 211, and it's associated base communication device 212 and ground tower 213, to intercept an adversarial UAV 221. In this example, the targeted device 221 is a UAV with a FHSS modulation implementation and proprietary communications link security protocol. The Detachable Drone Hijacker 202 receives an instruction set from the ground tower 213 with the signal of interest and then goes through a set of procedures meant to mitigate the threat device. This can include, but is not limited to, a deauthentication attacks, packet flood attacks, reflection attacks, replay attacks, or even a full man-in-the-middle hijacking of the communications link to send the targeted drone to a predetermined location. Because the Detachable Drone Hijacker 202 can be linked with a ground station 211, it can also receive updated instructions to change the attack method. These can also be pre-programmed into the Hijacker. This example by no means is the limiting case for the Detachable Drone Hijacker 202, as it is also capable of autonomously attacking a target, whether that be a commercial or government unmanned vehicle.

According to another embodiment of this disclosure, a Detachable Drone Jammer is provided. The Detachable Drone Jammer is a detachable, lightweight, and low-power consuming electronic warfare device that targets unmanned aerial vehicles (UAV) which have been deemed to be adversarial. It targets adversarial UAVs by disrupting the communication links between a UAV, its ground control station (GCS), or other communication links to other devices (such as GNSS 231 (global navigation satellite system) and other UAVs). Its detachable nature gives the Detachable Drone Jammer a stand-in capability where it can exist amongst its targets and deliver air-to-air attacks.

According to an exemplary embodiment of this disclosure, The Detachable Drone Jammer combines the capabilities of a software defined radios 101 [Ref. 6] with radio frequency jamming principles [Ref. 13] to create a device with the following characteristics: Detachable, Lightweight, Portable, Low Power Consuming, and Jamming Capabilities. Because the Detachable Drone Jammer is a lightweight attachment, it may be connected by clip-on or bolt-on functionality for configuration to fit the needs of its host device, whether that device be another UAV, an unmanned ground vehicle, a waterborne unmanned surface vehicle, or unmanned underwater vehicle.

The Detachable Drone Jammer includes a power source 103, software defined radio 101, computing device 102, and an antenna configuration. The antenna configuration can be designed to work as an omnidirectional or directional antenna and includes a receiving 104 and transmitting 105 antenna. The Detachable Drone Jammer attacks the radio frequency links on a target device that control the target's telemetry, video, remote control, data transmission, and/or navigation. The Detachable Drone Jammer can implement combinations or subsets of the following electronic attack techniques: Broadband noise jamming, Partial band noise jamming, Sweep jamming, Tone and/or multi-tone jamming, Pulse jamming, Follower jamming, and Protocol aware partial dwell jamming. The Detachable Drone Jammer is an attachment that can serve as a stand-in device capable of air-to-air electronic attack against one or more target UAVs.

According to an exemplary embodiment, the Detachable Drone Jammer targets devices that use frequency hopping spread spectrum (FHSS) and/or direct sequence spread spectrum (DSSS) modulation schemes. The Detachable Drone Jammer is a portable and lightweight device that can be attached to a manned or unmanned platform with the intent of disrupting or degrading the communication links between a target drone and its controlling device. The Detachable Drone Jammer can jam [Ref. 10 and Ref. 13] the telemetry, video feed, remote control, and/or the navigation links depending on the target and the desired effect. The Detachable Drone Jammer executes its attack methods based on a library of information that is compiled to give it a range of attack options that will be the most effective, while remaining power efficient. The Detachable Drone Jammer's key features are its low energy requirements, light weight, and variable antenna configurations which yield multiple stand-in jamming options as opposed to the standoff jammers.

As with the Detachable Drone Hijacker, the Detachable Drone Jammer is distinguishable from other aerial electronic warfare and cyber-attack platforms in that it is designed to be a detachable and modular payload that can be configured to fit the needs of its host device. The hardware and software of the Detachable Drone Jammer can be configured to fit the needs of the host device, whether that be a UAV, an unmanned ground vehicle, a waterborne unmanned surface vessel, or an unmanned underwater vehicle.

The Detachable Drone Jammer is an attachable device that can clip-on or bolt-on to another platform which allows it to be used as a stand-in hacking device that can coexist amongst its targets. This stand-in aspect limits the unintentional damage to other devices in the area unlike a standoff device which may unintentionally degrade or disrupt the communications of adjacent devices. This implies a great amount of customizability, in that the device may be attached to various UAS or other vessels. The attachment configuration allows the Detachable Drone Jammer to be small, lightweight, and require low power consumption, while targeting various frequencies and modulation schemes used in commercial or government drones, including drone swarms. This includes devices that use FHSS and/or DSSS digital modulation schemes.

The Detachable Drone Jammer can be operated as a standalone device or linked to a ground, air, space, waterborne surface, or subsurface control system. Thus, it can integrate with other platforms and is not required to be purchased as a single full system solution. This link allows the Detachable Drone Jammer to receive updated instructions and target information as the operating environment changes.

Figure 3:
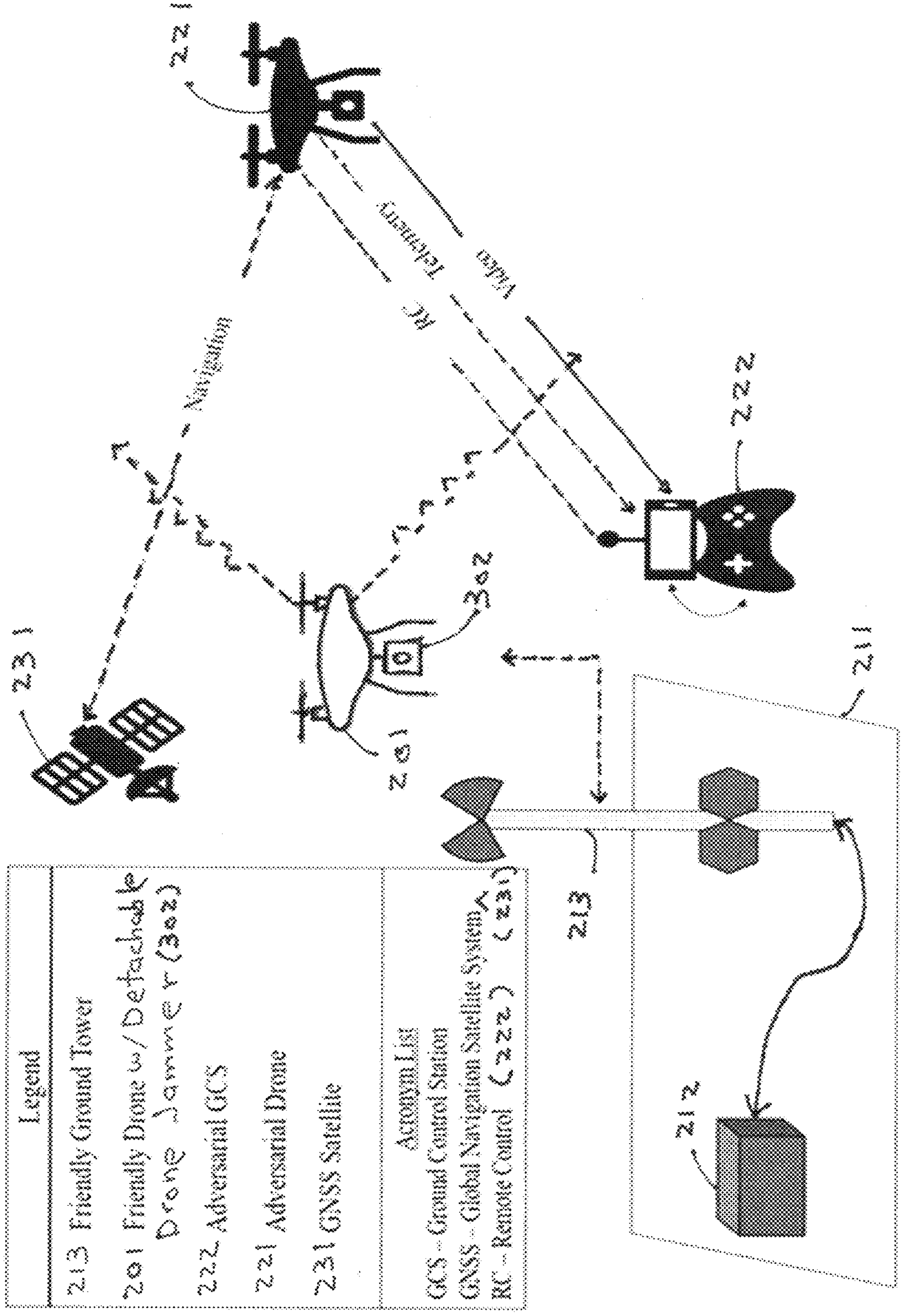
FIG. 3 is a schematic of another use case scenario where a Detachable Drone Jammer 302 is used to jam the remote control 222, navigation, telemetry, or video link of an adversarial drone 221, where the Detachable Drone Jammer 302 is dispatched by its ground control station 211 to intercept a target UAV 221. In this example, the targeted device is a UAV 221 operating with a FHSS modulation implementation. The Detachable Drone Jammer 302 receives an instruction set from the ground control tower 213 with the signal of interest and then goes through a set of procedures meant to mitigate the threat device. This can include, but is not limited to, broadband noise jamming of the entire 2.4 GHz ISM band, or a smart follower jamming of the frequencies used in the FHSS modulation scheme between the ground control station and the device. Because the Detachable Drone Jammer can be linked with a ground station, it can also receive updated instructions to change the attack method. These can also be pre-programmed into the jammer. This example by no means is the limiting case for the Detachable Drone Jammer, as it is also capable of autonomously attacking a target, whether that be a commercial or government unmanned vehicle.

FIG. 3 depicts a scenario where the Detachable Drone Jammer 302 is dispatched by its ground station 211 to intercept a target UAV 221. In this example, the targeted device is a UAV operating with a FHSS modulation implementation. The Detachable Drone Jammer receives an instruction set from the ground tower 213 with the signal of interest and then goes through a set of procedures meant to mitigate the threat device. This can include, but is not limited to, broadband noise jamming of the entire 2.4 GHz ISM band, or a smart follower jamming of the frequencies used in the FHSS modulation scheme between the ground control station 222 and the device 221. In addition, the Detachable Drone Jammer 302 can disrupt other communication links to the target UAV and other devices (such as GNSS 231 (global navigation satellite system) and other UAVs). Because the Detachable Drone Jammer 302 can be linked with a ground station 211, it can also receive updated instructions to change the attack method. These can also be pre-programmed into the jammer. This example by no means is the limiting case for the Detachable Drone Jammer, as it is also capable of autonomously attacking a target, whether that be a commercial or government unmanned vehicle.

For the purposes of this disclosure and the experimentation presented herein, the RF scanning method is the most important sensor system to understand. Consequently, an in-depth under-standing of digital communications is covered in further detail below as well as some understanding of the fundamentals of EM wave propagation to provide as basis to understand how UAVs communicate and to know which countermeasures exist to mitigate these threats. See also [Ref. 11]

RF sensors scan the most common frequency bands used by far for communications between an UAV and its GCS. Typically, these are set to scan the 433 MHz, 915 MHz, 2.4 GHZ, and 5.8 GHz frequency bands. Similar to modern radar systems, RF sensors use field programmable gate arrays (FPGA) and graphical processing units (GPU) hardware to allow for software defined signal processing, thus eliminating the need for a human in the loop.

There are two primary issues with RF scanning. First, the frequency bands used in UAV communications are wide and because many of them employ FHSS techniques, determining the sub-band a UAV transmits on requires detailed of the UAV's communication protocol. Second, because there is a lot of environmental noise from other devices in the four main frequency bands used in UAS communications, discerning signals of interest is resource intensive. For example, a wireless router operates using the 2.4 and 5.8 GHZ Industrial, Scientific, and Medical (ISM) frequency bands. Since these routers are ubiquitous in densely populated areas, it is difficult to discern between an adversarial communication link and normal traffic due to the surrounding RF clutter.

Radar sensors are among the most capable sensors used in detecting and tracking unmanned systems. These sensors use radio frequency pulses to detect and track an unmanned vehicle's RCS (radar cross section). Modern radar systems are built with advanced computer chips such as FPGAs and GPUs allowing the radar systems to become software defined. This allows each system to employ digital signal processing algorithms that both classify UAVs based on size and distinguish UAVs from birds.

Using radar sensors to detect, track, and identify SUASs (small unmanned aircraft systems) is one of the most difficult problems for radar engineers to solve. The RCS of a target is used to describe a target's scattering properties in decibel square meters, similar to how an antenna's gain, or directivity, is calculated. Radar is primarily limited by the target's size, the characteristics of the radar system and its components, as well as the viewing angle from which the radar sees the target. Due to the size of SUAS, they have much smaller cross sections than manned aircraft, making it more difficult to distinguish them from environmental clutter when compared to traditional air defense radar.

EO/IR (electro-optical/infrared) cameras are typically also employed with a computer-vision algorithm that enables the onboard computer to detect, track, and identify a UAV based on its visual and/or heat signature. These cameras can be used separately but are typically employed together. Depending on the sophistication of the algorithm used with the EO/IR cameras, they can be very useful in detecting, identifying, and tracking small RCS threats like UAVs and snipers.

EO/IR cameras face several limitations. First, because of the computer-vision algorithms, FPGAs, and GPUs, EO/IR cameras are expensive to build, manufacture, and maintain. Second, the technology necessitates large amounts of power, leading to their implementation as terrestrial platforms—an easier target for adversaries. Lastly, the autonomous or semiautonomous use of computer-vision algorithms are reliant upon accurate data points while training the algorithm. If the algorithm is trained with inaccurate or forged data, the computer fails to discern adversarial UAVs from friendly UAVs or even birds.

Acoustic sensors are used to detect UAVs based on the motor's distinct sound. For target classification, these systems passively listen for specific reverberations and match the detected signals to a library of known sounds. When multiple acoustic sensors are used at dispersed distances, the probability of detection vastly increases. Because of the surrounding environmental noise, acoustic sensors have a limited detection range and are not very effective in densely populated environments or during periods of high wind.

Combining multiple sensors allows for a robust countermeasure system rather than one lone device, for example combining radar, RF, and EO/IR sensors. For good reason, these systems have been used for border and infrastructure security against unmanned systems.

Sensor combination is inhibited by the chosen technology used in the C-UAS system. For example, there are inherent limitations in their designs that are primarily due to adverse weather conditions. Additionally, combining different systems makes them less mobile and expeditionary, which leads to the bulky and expensive towers.

Non-kinetic mitigation measures, also known as the less-than-lethal or soft-kill measures, are the actions taken to degrade, deny, or disrupt an adversary's capability without physical destruction. Soft-kill measures are usually temporary and are delivered through EW (electronic warfare) or cyber-missions. The two primary methods to target UAVs are through RF jamming or GNSS spoofing—both of which have been around for decades. Laser, directed energy, and high-powered microwave weapons are emerging technologies that defense contractors are exploring as precision mitigation measures.

RF jamming is designed to sever the communication link between an UAV and its GCS (ground control station) by injecting large amounts of electromagnetic energy, referred to as noise, into a receiving antenna. Uplink jamming disrupts the receiving antenna of the target UAV, while downlink jamming interferes with the receiving antenna of the GCS. Uplink and downlink jamming can be accomplished by two types of jammers: stand-off and stand-in. Stand-off jammers are devices located amongst friendly forces. Typically, they are large terrestrial or aerial sites that consume copious amounts of power to overcome the free-space path loss associated with their use. Stand-in jammers are within the weapons engagement zone of their targets (unlike stand-off jammers), but can have an outsize impact by significantly reducing the power requirements for signal disruption. Historically, RF jamming has been the most common C-UAS (counter-unmanned aircraft systems) mitigation technique.

RF jamming is limited by terrain, weather, equipment cost, and potential disruption of friendly and civilian devices. Terrain in the operational environment affect an RF jammer by causing increased signal attenuation from power lines, trees, and buildings. Adverse weather, such as rain, fog, and ice, also negatively affect the ways in which RF waves propagate. Particularly in the 1-300 GHz ranges, where most commercial UAVs operate, these weather phenomena tend to exacerbate the attenuation issues from multiple users operating in the same frequency band. RF jamming techniques is covered in further detail below, but each technique is also limited by the type of UAV an intruder is using and collateral damage considerations for surrounding communications devices. Many modern devices are hardened against rudimentary RF jamming techniques, which has led to new jamming techniques which require high-power consumption, thus increasing the complexity and cost of the C-UAS device.

GNSS jamming uses the same principles as RF jamming to disrupt the link between a UAV and its navigational satellite. This ultimately leads to a denial of service for the UAV operator and may trigger the device to execute an alternate course of action, such as returning to home. As with RF jamming, GNSS jamming can be accomplished through uplink or downlink jamming. Because the frequency bands of commercial devices operate on the known frequencies, GNSS jamming can be accomplished fairly easily to overpower the communications link between a target and its ground station.

The primary limitation of GNSS jamming is the increased collateral damage to friendly satellites or other systems operating in the same GNSS sub-band. Additionally, even if a GNSS link is severed on a fixed-wing craft, the device continues to glide despite losing guidance. Finally, UAVs, who mask their operating frequencies may not be affected by GNSS jamming.

GNSS spoofing is the most common cyber-attack method used in C-UAS technology. It is similar to jamming, except that it allows an attacker to impersonate and take control of the UAV by feeding it false communications or navigation links. Spoofing GNSS grid locations is fairly easy to accomplish if the device is using commercial frequencies to send fake signals to the target. One of the most common types of GNSS spoofing is known as a Carry-Off Attack, in which an adversary synchronizes its receiver with the target, then gradually increases the power of its counterfeit signal to draw the target away from its legitimate GCS to a pre-designated location of the attackers choosing.

GNSS spoofing is limited by the same loss functions associated with RF and GNSS jamming, requiring extensive consideration for uplink and downlink spoofing. Additionally, this attack method relies on knowledge of the operating frequencies of the target device. Many commercial UAVs do not have spoofing protections. Typically, this can lead to a positive countering outcome; however, if done from a friendly-UAV, GNSS spoofing can interrupt the navigation of the friendly-UAV itself. Additionally, if the UAV is a military target, an ample amount of intelligence must be gathered to reverse engineer the UAV's signal characteristics—especially if it uses a protected GNSS signal. Lastly, with the rise in spoofing of commercial and government systems, many unmanned devices are moving to FHSS-based modulation schemes in addition to increasing the data authentication standards for devices using GNSS navigation methods. FHSS communications make it more difficult to implement a spoofing attack as the attacker must hop onto the correct channel and follow the hop rate to inject malformed packets that contain the rogue GNSS information.

Laser dazzling uses a high-intensity laser beam to blind the camera system on a UAV. By blinding the camera system of an adversarial UAV, laser systems have the potential to disrupt an adversary's ability to accurately control their UAV for its assigned mission.

Lasers are primarily limited by the beam strength required to reach the UAV and saturate its camera system. This is a difficult feat for a human operator to do from the ground because of interference and beam scattering. This would require having at least some knowledge of the camera's look angle to best target the adversarial UAV. Additionally, lasers are susceptible to environmental conditions like rain, fog, dust, buildings and windows which can cause beam scattering, reflection, and refraction—all of which lead to a reduction in mitigation effectiveness. Laser systems consume significant amounts of power, which necessitate their use on the ground and further accelerates the aforementioned environmental and signal scattering issues.

Directed energy weapons focus large amounts of high intensity microwave energy at a target UAV to disable the aircraft's electronic systems. These systems can be very effect against single, or multiple, devices with precision. Directed energy weapons suffer from the same limitations as laser weapons in that they are affected by rain, clouds, fog, dust, or buildings that can cause beam divergence, refraction, or reflection, reducing beam's ability to mitigate UAS threat. These systems also require large amounts of power, are very expensive, and are not expeditionary.

Ground-based, fixed C-UAS sites are typically employed aboard military bases, secure facilities, and other strategic points of interest. Because they are operating with access to shore power, they have the most robust suite of countermeasures available on the market. Ground-based, fixed platforms also employ a multi-layered approach to their UAS countermeasures, integrating all (or most) sensor types with several mitigation methods. Lastly, these systems can have an autonomous mode that allows the platform to move through all aspects of the kill-chain with a human-on-the loop, human-in-the-loop, or human-out-of-the-loop.

These ground-based platforms require large amounts of shore power to operate the various sensor packages onboard. Additionally, because they are located in static positions, they become big and easy targets for adversaries to attack or sabotage—and an effective attack against the centralized system leaves a lack of defense layers. Lastly, these systems are expensive to acquire and sustain throughout the product life cycle.

Ground-based, mobile platforms are C-UAS technologies mounted on vehicles and operated while moving. Depending on the vehicle they are transported, they can be very capable in austere environments by carrying a modest amount of power and sustainment before needing to return to base for rest and refit.

Ground-based, mobile C-UAS systems like the MADIS have several glaring limitations. First off, they are human operated which requires extensive operator training on the system to ensure that the proper attack methods are used. Between operating the vehicle, the detection sensors, and the threat mitigation systems onboard, the MADIS is a manpower intensive vehicle that requires operators to go through an extensive amount of system training. Second, because they are general-purpose EW systems, the ground-based mobile systems require significant amounts of power that have a large RF signature. This power consumption means that the ground-based, mobile C-UAS cannot act as a persistent sensor unless there is a logistics resupply hub for the operators to tie into.

Handheld systems are operated by a single, or team of, individuals by hand. The DEDRONE DRONEDEFENDER is a good example of a lightweight handheld system that resembles a small arms weapon with a highly directional antennas. These devices are offered at a lower cost than the fixed, mobile, or UAV-based devices. The low power and portability of these systems gives another advantage over their larger counterparts; handheld systems can jam an entire frequency band with minimal collateral damage to friendly communications because of highly directional antennas and signal attenuation over longer distances. Because omnidirectional antennas propagate their signal in all directions, handheld C-UAS devices that use directional antennas can limit the collateral damage they inflict by pointing their signal in the direction of the intended target.

Due to their portability, handheld systems have a lower power setting than the larger mobile and fixed ground systems. This low power allows them to operate on 1 or 2 frequency bands and the lack of a library requires them to jam the whole band—typically the 2.4 or 5 GHz bands. Additionally, even though they use directional antennas, if there are other devices located behind the target, there may be unintended collateral damage to civilian or friendly communications. In urban environments communication signals are regularly degraded due to buildings, trees, and power lines, which increase signal attenuation and make handheld systems less effective at longer ranges. Finally, even though they are more portable than their mobile or fixed counterparts, handheld systems are still bulky and unwieldy; DEDRONE'S DRONEDEFENDER weighs 15.8 lbs., making it an unwieldy piece of gear for soldiers to carry for a sustained period of time.

The biggest benefit of an UAV-based (aerial) device is the maneuverability it provides for a defender. By giving forward depth in the battlespace, a defender can deliver a payload at greater distances than handheld or ground-based systems. With enough UAVs on hand, UAV-based countermeasures can act as aerial security patrols that mimic the interdiction patrols ground units use in defensive operations. This concept is discussed in further detail below.

Similar to the limitations of a handheld device, the UAV-based C-UAS systems have a smaller payload size that operates on lower power settings to increase their sustainability. Because they cannot be sustained indefinitely, they must have a built-in hand-off connection between a ground station, which increases the complexity in the system. In aircraft design, these are known as SWaP (size, weight, and power) considerations, which govern the systems and location of the systems placed on an aircraft.

Described now are some principles of electromagnetic wave propagation, link analysis, and an overview of methods to degrade the RF link between two devices. See also [Ref. 11]. The main takeaway (for purposes of this disclosure of Detachable Drone Hijacker/Jammer methods, apparatus, and systems) is that digital communications when bits of data are encoded onto RF waveforms, which requires the digital modification of analog waveforms. Understanding modulation techniques allows engineers to analyze power spectral density plots and demodulate target signals. Given the requisite background in digital signal processing, the reverse engineer then decrypts the contents of each data packet or interferes with the communications between hosts. These concepts are provided here to better support an understanding of the RF jamming techniques employed herein according to some exemplary embodiments of this disclosure.

Digital communications are carried out through the modulation and encoding of bit streams between hosts. In the past, analog communications were wholly dependent upon the hardware components built onto a device. However, over the past few decades electrical engineers, computer scientists, and others have vastly expanded the world's capacity to transmit data through the use of digital modulation techniques on software defined radios (SDR). The implementation and growth of SDRs has led to the ubiquity of telecommunications in modern countries because of the modularity afforded by changing a software program within a device. The commercialization of consumer- and micro-electronics has made SDRs less expensive for engineers to design radios for amplitude modulation communications, barrage jamming, or the remote injection of malware into a target device. With this in mind, it is important to have an understanding of how EM waves propagate between hosts, as the information contained within messages can be captured by attackers, demodulated, and then decrypted to reveal useful information to an attacker.

The link between two communication systems encompasses the entire path, from the in-formation source, through the encoding and modulation steps, into the transmitter and channel, up to the receiving source, and back through the signal processing steps until the communication link is terminated at the receiving information sink. "Link budget" refers to the one-way link analysis of a signal. In determining the link budget, the engineer gains useful information about signal power, noise power, free space path loss, as well as environmental losses. By analyzing the link between systems, an error probability can be established to learn about the system's design, performance, and ability to communicate with other devices. When dealing with spread spectrum signals that may operate beneath the noise floor, detection and interception of wireless traffic becomes very difficult because each communicating device operates on low-power settings that make it hard to distinguish between noise and a signal of interest.

When evaluating system performance, the most important variable to quantify is the signal-to-noise ratio (SNR). This is because a receiver must be able to detect signals in the presence of noise within an acceptable error probability. In order to evaluate the SNR of a system, there are several key pieces of information to be evaluated, including effective isotropically radiated power, the gain of the receiving antenna, the system losses, the path losses, the distance between the receiving and transmitting antennae, the wavelength associated with a given carrier frequency, the amount of transmit power, the gain of the transmitting antenna, the speed of light measured at $3\times10^8$ (m/s), and the carrier frequency measured in hertz.

The effective isotropically radiated power (EIRP) is the amount of power emitted from an isotropic antenna to obtain the same power density in the direction of the antenna pattern peak which is calculated by multiplying the gain of the transmitting antenna by the net power from a connected transmitter.

Path loss is the power lost as the propagating wave front attenuates over a given distance, between the transmit and receive terminals. The path loss is the most significant loss to account for and can prevent wireless communications from reaching their intended destination.

System losses are important to note because telecommunication systems are imperfect, which leads to power losses from noise within the system. The system noise occurs due to modulation distortions, mismatches between the transmitter and its antenna, or noise amplifications. More often than not, these losses are ignored when analyzing the full system; however, inducing excess system power loss is an important technique in disrupting communication systems.

Antenna gain is the focused antenna output in a given direction where the beam has a maximum value relative to an isotropically radiated source.

As mentioned in the previous subsection, determining the SNR power ratio at the receiving antenna is critical to the reception of telecommunications.

Communication engineers design communication devices to be optimized for reliable communications. In government systems, this includes the addition of sidelobe filters so that an attacker can only target the main beam of the receiving antenna, making it more difficult to jam. However, with many commercial systems, engineers are seeking to optimize reliability at a reduced cost to increase the profit margin associated with manufacturing at scale. Given this understanding of communications link analysis, would-be attackers can more easily disrupt the RF link between antennas through a variety of jamming techniques. By taking into consideration the antenna size, transmit power, and carrier frequency with relation to environmental and system noise considerations. By understanding the variables within the Friis and the SNR equations [Ref. 11], engineers can interpret how an influx of power will increase the likelihood of communication reception. Additionally, these equations allow engineers to analyze the negative effects of a system's temperature on the entire system. Finally, and most importantly, this type of analysis is important for engineers to design an antenna that fits the needs (in terms of type, size, and polarization) of the entire system. For example, a transmitting antenna that is right-hand polarized antenna will not be able to communicate with a receiving antenna that is left-hand polarized because of the difference in phase between the communicating devices. Additionally, a transmitting omnidirectional antenna can propagate in all directions around a fixed axis, but because omnidirectional antennas are inefficient, they require an excess of input power to maximize the received signal strength.

Currently, the current primary means of attacking the RF link of a communication system is done by jamming the signal between a transmitting and receiving antenna. RF jammers use a variety of strategies to generate high levels of noise and disrupt the link between an unmanned vehicle and its control station. However, as many modern communications schemes employ LPI (ow-probability of intercept), LPD (low-probability of detection), and LPE (low-probability of exploitation) modulation techniques, modern RF jamming equipment requires high-power output in addition to knowledge of the specific frequencies that an unmanned system is using to "hop" on. When it comes to UAVs that do not emit RF energy by connecting to a GCS, it is nearly impossible to use RF jamming as a mitigation technique. Thus, from this point forward, we will focus on the mitigation techniques for UAVs that maintain some form of RF connection with its GCS. Given this, broadband noise (BBN), partial band noise (PBN), sweep, pulse, follower, and smart noise jamming are currently the most important techniques to understand when disrupting modern digital communications.

When using noise jamming techniques, a jammer modulates a carrier signal with a random noise waveform to interrupt the communication of an intended target [58]. The jamming signal's bandwidth can be as wide as the entire spectrum used by the target, or as narrow as a single channel.

Another jamming technique, BBN jamming, spreads Gaussian noise across the full width of the target's anticipated frequency spectrum. For example, if a UAV and its GCS communicate on the 2.4 GHz frequency band, then a BBN jammer would place Gaussian noise across the 2.4-2.5 GHz frequencies, requiring 100 MHz of bandwidth. This technique is useful against all communications by physically locating the jammer between an adversary's communication links to overwhelm the legitimate communication with Gaussian noise. BBN jamming differs from the other techniques in this respect, as it is more focused on overwhelming an entire frequency band, instead of providing targeted disruption of a signal of interest. To mitigate fratricide, directional antennas are needed to avoid interference with friendly communications in the same frequency band. Additionally, since broadband jamming raises background noise levels, it degrades the synchronization and tracking processes of the targeted communication scheme. The primary limitation with BBN jamming is its inefficient use of power, large system size, and the likelihood to inflict unintentional collateral damage to adjacent communication systems.

A PBN (partial band noise) jammer uses noise-producing energy to disrupt multiple channels used by the target in a given frequency band. PBN jamming differs from BBN jamming because it does not require channels to be adjacent to one another to disrupt the signal of interest. On the other hand, a narrow band noise (NBN) jammer focuses all of its noise energy across the width of a single channel.

Tone jamming is similar to NBN, but it uses one or more jammer tones placed strategically within the spectrum to disrupt a signal. Single-tone jamming, also referred to as spot jamming, happens when the carrier wave is modulated to disrupt very narrow targets that do not change channels, such as on-off keying telegraphy. Single-tone jammers can be useful against DSSS (direct sequence spread spectrum) systems to overcome the receiver's processing gain, thus causing adverse ramifications when signals are recombined within the communicating device. When the jammer power is fixed, more power can be placed in a single tone, increasing the probability of overcoming processing gain. Multiple-tone jamming seeks the disruption of multiple channels at specific or randomly placed frequencies while comb jamming (another tone-jamming type technique) disrupts consecutive channels.

Sweep jamming is similar to broadband and partial-band jamming in that it uses a relatively narrow signal with an arbitrary bandwidth that is swept, or scanned, across the target's operating frequency band. Because the signal is swept, this jamming technique can disrupt a wide frequency range in a short period of time. The sweep jammer can accomplish this by using low power and bandwidth requirements in comparison to BBN jamming. By using a designated bandwidth, the sweep jammer can degrade entire sets of hop frequencies where a PBN would be ineffective because of its fixed status. Timing is the most important limitation in sweep jamming because the sweeping must be fast enough to ensure the whole band is covered in a sufficiently short period of time or the signal's frequency hops will occur at a time in which no signal is present. However, sweep jamming cannot be so fast that it fails to adequately jam the fraction of the signal required.

A pulse jam is similar to PBN jamming but is predicated upon the time a jammer is used instead of being in a continuous-use state. While this leads to roughly the same effectiveness as PBN, pulse jamming has a lower average power consumption. Follower jamming attempts to locate the frequency to which the frequency-hopping transmitter moved, identify the target frequency of interest, and jam at the new frequency. This is also referred to as responsive, repeater, or repeat-back jamming and is primarily constrained by the target's signal timing due to signal processing, wave propagation, and hopping speed.

Follower jamming with NBN places a noise waveform in the channel to hinder the receiver's ability to properly detect the tone, while follower tone jamming enhances the intended receiver's ability to properly detect the signal just as it does for NBN jamming. Noncoherent frequency shift keying receivers measure the energy from the channel filters for signal detection, thus adding additional energy at the correct frequency increases likelihood of detection.

FHSS jamming is best accomplished through the use of a follower jammer where only a portion of each dwell is jammed, meaning the jammer has to ascertain the newly detected energy and determine if it is the correct signal to jam.

Protocol aware or smart jamming disrupts digitized signals selected based on an algorithmic library. While similar to follower jamming, protocol aware jamming requires more target information. Additionally, a protocol aware jammer is more capable in that it can predict the next frequency the target will hop to, therefore disrupting the signal continuously. This requires extensive synchronization and knowledge about the target signal to track the timing and phase of the transmitted signal. The major limitation with protocol aware jamming is that the time acquisition must be known to determine the signal used for communications.

The goal of jamming a communications signal is to deny a reliable connection between two hosts using the minimum-required equipment, power, and antenna [58]. Thus, when designing communication systems, engineers seek to create jam-resistant waveforms to "force a jammer to expend its resources over a wide-frequency band, for a maximum amount of time, and from a diversity of sites".

In modern digital communications, anti-jam (AJ) communications seek to vary the frequencies used, time hop, and use narrow-beam antennas to put a jammer at a disadvantage compared to the communicator. These AJ techniques are used in frequency hopping spread spectrum (FHSS) and direct sequence spread spectrum (DSSS) modulation schemes. This is due to the notion that the intelligibility of information transfer can be sufficiently degraded by only jamming 30% of a voice transmission. In AJ systems, an unmodulated carrier signal is centered on the transmitting frequency and then modulated with one (or more) tone signals, or modulated with a varying-bandwidth noise signal. These tones are placed based on prior knowledge of the target to prevent signal reception by raising the SNR. When using a friendly UAV to jam an adversary's UAV, a Two-Ray Propagation JSR is useful in understanding the relationship between antenna height to find the optimal JSR due to ground reflections. In Two-Ray Propagation, it is assumed that both the receiver and transmitter are affected by ground reflections. The JSR has a linear correlation with the ratio of the jammer antenna's gain with respect to the target's transmitting antenna. Additionally, there is a linear relationship between the power ratio of the jammer in comparison to the transmitting device. This is expected, as the jammer power increases, that the targeted receiving antenna will be unable to communicate with its normal device. Additionally, as the height of the jammer increases, the power requirements of the jammer to maintain the same JSR go down. This is because of ground reflections that are amplified when the height ratio is in favor of the jamming antenna.

Spread spectrum techniques typically use a known-pseudonoise, or pseudorandom, spreading code shared between networked nodes, making interception difficult. The original data is then recovered by a receiver and synchronized using the spreading code, then compiled into the original data packet. The two most common spread spectrum techniques are DSSS and FHSS, which lower the probability of signal detection and interception, yielding higher security and privacy. The AJ properties of DSSS and FHSS signals force jammers to distribute their power over a wider bandwidth, which in turn increases system resilience by decreasing fading and increasing resolution range.

A DSSS device, uses a carrier wave modulated with a data signal, combined with a wideband spreading signal to send larger amounts of data between systems than a traditional narrow-band signal. The spreading signals in DSSS techniques contain accumulated data that correlates to specific code sequences to ensure reception between the two communicating devices.

While similar in that they decrease the power required for reception and spread the signal over a given frequency band, FHSS devices occupy a given transmission channel for an allocated amount of time before moving to the next channel. This allows each communication channel to be used by multiple devices and permits the FHSS signal to hop in a pseudorandom sequence with its receiving device.

Compared to other signaling methods DSSS and FHSS offer no error performance advantage against thermal noise. On the other hand, they also have no disadvantage either, making them an attractive option for multiple access systems like WiFi routers and Bluetooth. Both DSSS and FHSS techniques allow for the detection of signals that have a power spectral density below the noise floor, giving them the LPD, LPI, and LPE properties previously discussed.

DSSS is typically used in wireless links such as Internet of Things (IoT) devices and Institute of Electrical and Electronics Engineers (IEEE) 802.11 schemes while FHSS is used in wireless links where LPD and AJ properties are more desirable. Identifying and jamming a DSSS signal is easier to accomplish than for a FHSS signal.

Additionally, because IEEE 802.11 standards use the DSSS modulation technique, it is easier to target these types of devices even if they are difficult to find.

While the jamming of DSSS signals is easier than FHSS signals, it is by no means trivial. Spreading codes used in DSSS make single tone jamming obsolete. These spreading codes then necessitate a broadband noise jam, causing the EW engineer to design a system that requires large power consumption to overcome the target's received power.

Due to the clutter in the ISM bands where most commercial UAV communications occur, RF detection and mitigation are very complicated problems to solve. The LPD, LPI, and LPE characteristics of FHSS and DSSS signals allow the signals to hide amongst the background clutter, making it more difficult for attackers to identify and disrupt signals of interest. Engineers and EW system designers can develop more effective mitigation measures by understanding RF communications, the link budget equation, and the fundamentals of jamming. This understanding is foundational to the attack methods further described below.

It should be reiterated that, regardless of which RF jamming technique is used, the necessity of significant power increases the physical parameters of a system. This has a deleterious effect on the form, fit, and function of a modular payload that could be used as a bolt-on solution to other systems. In addition to the issues with SWaP tradeoffs, RF jamming also has negative effects on the sensor's packages integrated on board its host aircraft. Because of the collateral damage and SWAP considerations, integrating RF jamming on manned and unmanned aircraft is an incredibly difficult process. While spread spectrum techniques do offer higher security and privacy to users because of lower power requirements that make them more difficult to detect, there is still a need for data encryption and authentication to ensure that digital signals reach their intended recipients. It is here where we turn our attention to the use of cyber-attack techniques for opportunities to disrupt adversarial UAVs.

A major component for interception of communications between end-devices of each of these equations is the power required. When using electronic attack methods such as RF jamming, the calculus becomes a matter of overpowering the signal strength between two users. Notably, this type of link budget analysis is absent when discussing cyber-attack techniques. This is because cyber-attacks exploit the communication protocol vulnerabilities, instead of trying to overpower the received signal of a targeted device. While the link budget is still a factor when delivering a remote cyber-attack, it is only important insofar as an attacker can send one packet containing malicious data to its intended target.

Figure 4:
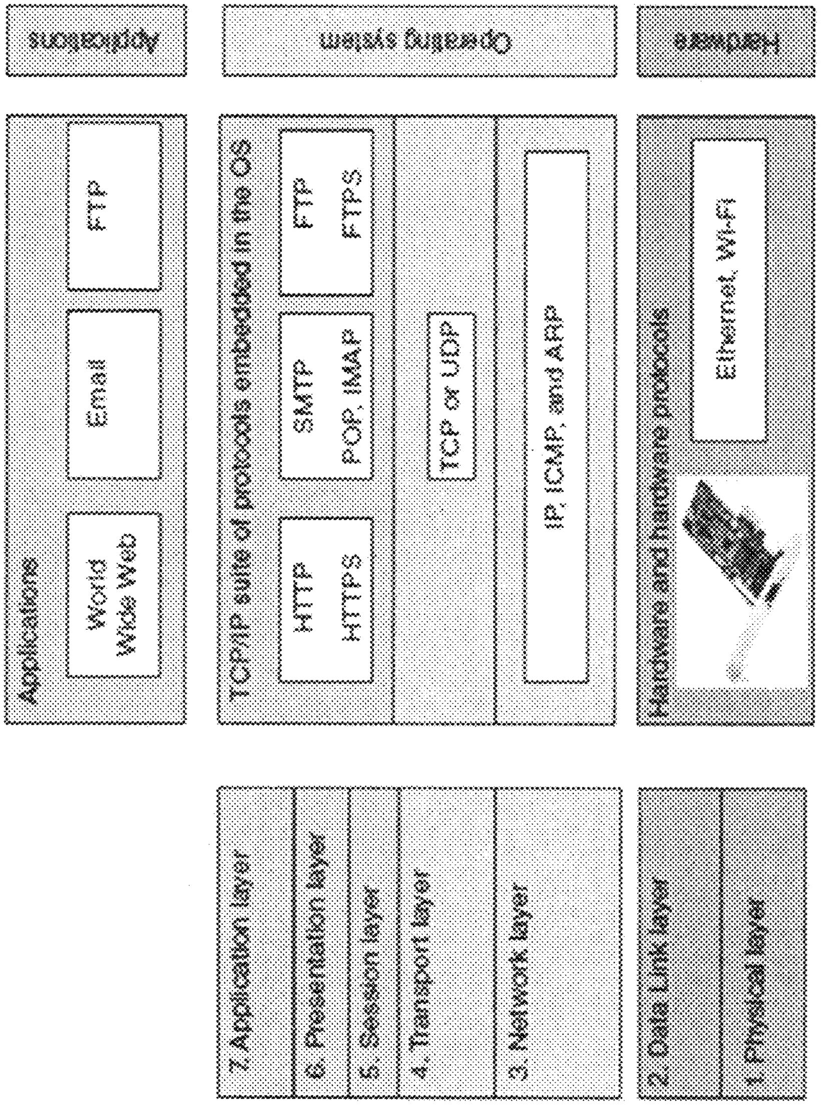
FIG. 4 shows a Seven-Layer OSI Model (Open System Interconnection).

UAVs operate using the same principles of digital communications as terrestrial information systems, making them vulnerable to the some of the same cyber-attacks carried out in the past three decades. Discussed now is the OSI (Open Systems Interconnection) Model (FIG. 4) and how it enables the transmission of digital information, and the most applicable cyber-attacks to target UAVs. While there are technical limitations to each cyber-attack technique, this approach takes more of a scalpel's edge approach when compared to RF jamming. Cyber-attack vectors typically require less power because they have a priori knowledge of an information system. Second, cyber-attacks lower the risk of collateral damage to surrounding infrastructure. Finally, because there are lower SWAP requirements in comparison to RF jamming, cyber-attacks can be easily delivered via a friendly UAV.

The OSI Model is a seven-layer model that represents how information is transmitted between digital communication devices. The seven components are the application, presentation, session, transport, network, data link, and physical layers. While the Session Layer, Presentation Layer and Application Layer are tightly coupled and grouped together, it is important to separate each layer because of how communication protocols affect the packaging, transmission, and presentation of information. To introduce the seven layers (Application Layer, Presentation Layer, Session Layer, Transport Layer, Network Layer, Data Link Layer, and Physical Layer) of the OSI model it is helpful to use the analogy of sending a letter through the mail service and road system, with each layer governed by a different set of protocols. Beginning with a user writing a business letter, the sender then drops their letter off at a post office box. From there, the post office sorts and processes the mail to send to a delivery truck, where the driver adheres to local traffic laws. Once reaching their destination, the driver drops the letter off at the receiving person's mailbox.

As it relates to the OSI model, the actions where the sender writes, packages, and drops the letter in the mailbox correspond to the Session Layer, Presentation Layer and Application Layer of the OSI model. The infrastructure required by the road network, post office, and delivery drivers are the Transport Layer, Network Layer, Data Link Layer, and Physical Layer, considered to be a part of the telecommunications stack, where RF communications intersects with digital modulation. The system finally terminates when the recipient reads, opens, and processes the contents of the letter, where the Session Layer, Presentation Layer and Application Layers remain the same layers as when the letter was sent; this time, in reverse order. Lastly, protocols refer to the standard operating procedures for a given action. For example, a business letter is written in accordance with specific rules, also known as a protocol.

The Application Layer is the interface where data passes through two (or more) applications or utility programs on different computers. This includes the application programs that provide web browsers and web servers using Hypertext Transfer Protocol and Hypertext Transfer Protocol Secure, as well as the utility programs that provide system services like Simple Network Management Protocol.

The Presentation Layer displays data in a manner that the receiving application can interpret. When sending an email, this takes the form of compression, encryption, and translation of an email sent between hosts.

The Session Layer receives raw data without division or concatenation to provide the presentation layer with organized data for multiple sessions. The Session Layer protocols establish and maintain a session connection between hosts.

The Transport Layer transfers Application Layer payloads by using control information to encapsulate data packets to send data to a specific port on a receiving machine. The two primary Transport Layer protocols are Transmission Control Protocol (TCP) and user datagram protocol (UDP), both of which compress packets into a transmissible size. For TCP these compressed messages are called segments, while UDP divides messages into datagrams.

TCP is referred to as a connection-oriented protocol because it uses a "three-way" handshake to guarantee message delivery between hosts. The initiating client sends a synchronize (SYN) packet to the receiving device, which follows up with a SYN/acknowledge (ACK) packet to correlate and confirm receipt of the connection. Finally, the initiating client sends a final ACK packet to their intended recipient to confirm and establish a true connection. If at any point the handshake is broken, the transmitting host receives information stating that the desired message was not delivered.

Meanwhile, UDP is considered a connectionless protocol that does not guarantee delivery the same way that TCP does. UDP is typically used for broadcasting information or monitoring network traffic and is faster at transmitting data than TCP.

The TCP protocol is more reliable than the UDP protocol because of its connection guarantee for information transmission. However, it is slower than UDP and if an attacker can disrupt an element of the TCP handshake, they can carry out a DoS attack. Both TCP and UDP flood attacks were used by the hacktivist group Anonymous in the 2010 DDOS (distributed denial of service) attacks.

The Network Layer transfers messages between nodes by determining the physical path a message takes until reaching its destination host. It is also known as the Internet Layer, and the most common protocol used is Internet protocol (IP), which makes a packet by adding a header to the segment or datagram. This header identifies the transmitting node and receiving host by an IP address, unique to each node on a network. IP is supported by other protocols like Internet Control Message Protocol and Address Resolution Protocol, which help the transmitted packet find its way to its destination. Adding the network layer header makes the packet larger, and if it is too large for transportation, the protocol breaks the packet into fragments. The fragmentation process is not lossless, which may lead to a receiving host not recovering all of the transmitted data.

The Data Link Layer adds its own control information in a header at the beginning of a packet and in a trailer at the end of a packet. This transforms the data packet from the Network Layer into a frame which contains the hardware media access control (MAC) address of the transmitting and receiving network interface cards (NIC). A MAC address, also referred to as an extended service set identifier (ESSID) or a hardware address, are unique device identifiers that can only be found within nodes on the local network.

Most MAC addresses are required to register with the IEEE organizationally unique identifier (OUI) public database. This forms the basis for the experimentation covered below, as this public information provides would-be attackers with an easy method to automate the identification and attack of a wireless access point. MAC addresses are also easily spoofed, allowing attackers to mask their identity. For the purposes of the experimentation covered below, the data link connection between a target UAV and its GCS is targeted.

The Physical Layer represents the interaction at the bit level from which an information system sends streams of "0s" and "1s" via a wired or wireless transmission to its destination. It is here where the OSI model then interacts with EM waves that propagate between receiving and destination sources. This interaction is where the RF jamming techniques previously discussed seek to disrupt the communication flow between information systems.

Now that a baseline understanding of the OSI Model is established, there are several noteworthy cyber-attacks for eavesdropping, intercepting, or interrupting the data between a UAV and its GCS. It is much simpler to carry out attacks on UAVs using IEEE 802.11 wireless schemes than on UAVs using FHSS modulation schemes. This is because IEEE 802.11 WiFi communication uses a DSSS technique, allowing for the easy targeting of layer 2 MAC addresses, while FHSS eavesdropping spreads the signal out over a larger frequency range with a hopping sequence to match. Thus, even if eavesdropping is successful, creating a FHSS transmitting device to successfully inject malicious packets of information at the correct hop speed and with the right information is a highly complex problem. However, given the requisite information by reverse engineering a signal of interest, the following attacks are possible as singular or combined options against a target UAS.

A man-in-the-middle (MITM) occurs when an adversary intercepts the communication between two communicating devices and, by various means, is able to successfully im-personate one device to the other, ultimately giving the attacker access to the transferred data between end-users. Also known as an adversary-in-the-middle attack, this attack compromises the integrity and confidentiality of a given security scheme without notifying the server or the client. By subverting entity authentication controls and intercepting the communications, an attacker can subsequently alter and manipulate the information transmission between devices at their discretion-including hijacking a target or spoofing GNSS navigation. Thus, a MITM compromises the confidentiality, integrity, and availability between two communicating devices through impersonating, location-based, or communication channel techniques.

Understanding methods to achieve a MITM is essential to grasping the attacks laid out in the framework established below. According to the Common Attack Pattern Enumeration and Classification community, a cyber-attack resource operated by the government-contracted MITRE Corporation, a MITM has the following prerequisites: two components must be communicating with each other with insufficient encryption or data authentication for an attacker to identify and eavesdrop on the communication exchange with or without the target's knowledge. Alternatively, there is a lack of sufficient mutual authentication between the targets giving way to attacker interposition. From this point, an attacker can subsequently manipulate the actions of its target. A MITM is reliant upon the exploitation of protocol or system vulnerabilities, which makes a MITM more of an end state instead of a cyber-attack. If Eve is the MITM seeking to intercept the network traffic between Alice and Bob. Once Eve is able to establish a network connection between her targets, she then carries out a variety of attacks, including the hijacking and spoofing of network traffic.

While much different from a MITM, protocol attacks such as UDP and TCP/SYN Flood attacks can be an integral part of achieving a desirous end state for the attacker. Both the UDP and TCP/SYN Flood are examples of DOS attacks that are more effective when multiple, distributed systems are used, creating a DDOS (distributed denial of service) attack, for example a DDOS attack using computers and other networked IoT devices to create a surreptitious botnet that prevents normal communications from occurring as planned.

Both flood attacks are easy to carry out using open source tools like Low-Orbit Ion Cannon or hping3 to flood a target server with TCP or UDP packets to disrupt the service connection. The DDOS attack is particularly sinister if implemented properly as this type of attack is unpreventable and can only be mitigated through firewall strengthening and filtering protections.

In February 1996, the CERT Coordination Center at Carnegie Mellon University "received reports of programs that launch DOS attacks by creating a 'UDP' packet storm either on a system or between two systems". This is known as a UDP Flood attack that degrades the host performance by increasing packet congestion. This attack is also accompanied by IP spoofing, and because the UDP protocol is connectionless, an attacker can send out broadcast packets to congest and deny service to all hosts on the network. While a DOS attack can be devastating, this type of attack by itself does not allow an attacker to gain additional access to a target system.

UDP Flood attacks can deliberately target and disrupt local firewalls because the UDP protocol has built-in resistance to local firewall protections. Therefore, the only meaningful way to stop this type of DDOS attack is through dedicated DDOS protection built into the application and transport layer protocols.

In September 1996, the CERT Coordination Center at Carnegie Mellon University issued another CERT Advisory regarding TCP/SYN Flood and IP spoofing attacks. This advisory described an attack method that exploits the three-way handshake in the TCP connection process.

A TCP Flood attack works by exploiting the open "SYN-ACK" connection between a client and a server before the "ACK" message is received by the server. Because the server's data structure is of finite size, sending an overflow of partially-open connections with a spoofed IP address denies the connection between the original client and the victim server]. Ultimately, a TCP Flood attack results in a DoS, where the service itself is unharmed, but the ability to provide the service is impaired by exhausting memory, crashing the system, or rendering it inoperable.

This attack is significant because any device that is connected to the internet is vulnerable to this type of attack, making it difficult for the victim to accept any new network connections. Because the IP address is spoofed, the network continues forwarding packets based on its destination address unless input source filtering is enabled, which is only a temporary fix in reducing IP spoofed packets.

A layer two deauthentication attack exploits behavior in 802.11-based wireless access points to prevent legitimate users from accessing a network. A deauthentication attack is very adaptive, as an attacker can elect to limit an individual client's access or deny service to an entire channel. To prevent a target from hopping to a new channel, an attacker can simultaneously scan adjacent channels to deny service continually.

A deauthentication attack can be delivered by placing a wireless NIC in monitor or promiscuous mode so an attacker can view the network traffic between a user and a wireless access point by correlating the MAC hardware addresses associated with each device. The MAC addresses of layer two devices are easily scanned via the public IEEE OUI database where attackers can scan for specific targets.

Regardless of network encryption such as Wired Equivalency Protocol, WiFi Protected Access (WPA), WPA2, or even WPA3, an attacker can deliver a DOS attack by simply sending deauthentication frames between a target access point and its legitimate clients. This type of attack is especially useful in capturing the WPA handshake between access points and clients for offline dictionary attacks used in gaining access to a target system. The deauthentication attack is useful in energy conservation but is limited in that it is only effective against targets using MAC protocols—such as wireless access points.

A reflection attack occurs when an adversary reflects a message to the sender by impersonating the receiving host which can lead to a DoS or an impersonation attack. For example, if Alice and Bob are communicating with one another, and Eve is the MITM, Eve would impersonate Bob and send the reflected message that originated with Alice back to The mutual authentication standards established a distinguishing identifier between users. However, there are no requirement for UAV manufacturers to comply with the standardization process from the International Organization for Standardization. Additionally, despite yielding integrity and authenticity, the mutual authentication standard does not yield privacy for communicating users. Thus, to successfully carry out a reflection attack, an attacker must have first-hand knowledge of the protocol, the most vulnerable part of which is when a client initiates the handshake rather than a server.

A replay attack occurs when network traffic is captured between hosts and then retransmitted back to either host. By retransmitting the captured information, an attacker can use the authenticated traffic to produce undesired effects or gain unauthorized access. These attacks can be especially useful when an attacker is able to impersonate a legitimate user, thus gaining access to the network and issuing commands to the target client.

A Key Compromise Impersonation (KCI) attack occurs when an attacker compromises, e.g. a client secret key, and then uses that information to impersonate connections back towards the client for further exploitation. While most of the literature on these attacks focuses on compromising Transport Layer Security (TLS), a KCI attack may be useful for a C-UAS device. This is because a KCI attack targets the cipher weaknesses in authenticated key agreement protocols, which in turn allows the attacker to conduct further MITM attacks to block connection, connect to the victim server illegitimately, or issue malicious code to the victim. If an attacker can compromise the authentication key established between a UAV and its GCS, the attacker can then impersonate the GCS. This type of attack would target the keys on the UAV, as opposed to the keys on the GCS, which is more of a concern than compromising the GCS key.

GNSS spoofing is an attack method where a spoofer generates a counterfeit signal for each authentic signal received to distort the relative true location of a target in favor of a counterfeit location that is more favorable for the spoofer. In order for an attacker to sufficiently exert control of a target device via GNSS spoofing, the attacker must capture the GNSS signal of interest dynamically or through a priori knowledge. There are two primary methods of capturing GNSS signals for spoofing attacks: overt and covert capture.

Overt capture involves GNSS jamming of the authentic signal followed by the injection of a new reacquisition signal. In this type of capture, the attacker does not conceal its attempted subjugation, and experiments have shown that a power differential, of 10 dB is sufficient in overwhelming the authentic signal, in favor of the spoofer's signal.

Covert capture differs from overt capture in that it seeks to avoid the anti-spoof blockers a target may have and remaining undetected throughout the spoofing process. This is done through evading the target's JSR monitors, as well as evading the frequency unlock monitoring of a GNSS receiver. Covert capture is a more effective spoofing technique than overt capture as it bypasses the target system's internal blockers without alerting the target that it is receiving counterfeit GNSS signals. However, covert capture is a highly complex process and difficult to implement.

In sum, the attack types outlined above provide a baseline for mitigating future attack vectors against adversarial UAVs. According to an exemplary embodiment of this disclosure, a library of attack vectors, designed to mitigate the threat posed by commercial UAVs, is integrated with a menu of options within a graphical user interface (GUI). This fully-automated GUI gives the operator monitoring the system a common operating picture of local threats and actions taken. While this was only lightly touched on in the discussion on deauthentication attacks, cyber-attacks notably consume less power than the BBN jamming techniques earlier discussed. This is because each cyber-attack focuses on protocol vulnerabilities within the OSI model instead of trying to overwhelm the received signal during an RF jamming attack. While each attack covered exploits a different (sometimes overlapping) protocol vulnerability than the others, and some can be patched easily, many UAV manufacturing companies continue to design and build UAVs with known vulnerabilities. This is in part due to the lack of concern for data privacy and security by consumers because the typical commercial user wants an efficient product at a low price point.

Redesigning the Counter Unmanned Systems Architecture

This section builds upon the knowledge gained from the previous disclosed materials above to form a new framework to augment and enhance the current C-UAS systems. As previously discussed, the most capable of the C-UAS technologies on the market are the static ground systems like the CACI SKYTRACKER [Ref. 3] and the ANDURIL Sentry Tower [Ref. 4], as well as the mobile MADIS [Ref. 12]. While all three systems have had operational successes, these "watch-tower" type systems indicate that the acquisition of C-UAS technology remains incomplete. This is because each system, while capable in its own right, has significant disadvantages when facing more than one UAV threat.

Disclosed now is a novel approach to enhance current practices used in defense-in-depth and air-to-air combat operations. In historical warfare revolutions, technology has created an opportunity space for new procedures, techniques, and tactics to take hold. Whether this was the biplane in WWI, anti-ship cruise missiles in the Yom Kippur War, or precision-guided munitions during Operation Desert Storm, technology has been the first innovation while organizational and tactical implementation has followed closely thereafter. By borrowing from the lessons learned in modern defensive operations and air-to-air combat, this chapter focuses not on innovative technology, but instead revises the current tactics used in countering unmanned systems and outlines a unique way of approaching the problem. Rather than the aerial battles that have captivated audiences for over a century, the dogfights of the next century will be defined by shooting bits of information and electromagnetic waves instead of rockets and missiles.

Example Scenario

At the hydroelectric power facility, each C-UAS watch tower is reconfigured with a new type of UAV security patrol outfitted with the Detachable Drone Hijacker, termed by the security guards as the "Alphas." This upgrade is significant as the Alphas deploy forward of the watch towers on a patrol schedule and the security patrols can receive mid-flight updates from the towers to guide their attack methods. Additionally, given their small form-factor and low-power consumption, the Alphas can patrol for an hour a piece, giving the watch officers a persistent presence to augment the sentry towers.

While on watch, the security guard receives a notification from the northeast tower's radar sensor that there is a 95% probability of an inbound UAV swarm moving at 20 miles-per-hour. A few seconds later, the guard receives another notification, this time a swarm of 10 UAVs are flying at 25 miles-per-hour directly at the southwest tower located on the dam's primary entry way. The guard's display shows a heterogeneous swarm operating on the 2.4 GHz band. Due to the swarm's rapid speed and multi-directional attack, the security guard deploys the Alphas to counter the approaching swarm with mid-air interdiction. The guard still reserves the capability to jam the entire 2.4 GHz frequency band using the omnidirectional antennas of the watch towers as backup.

The Alphas begin to issue UDP packets and deauthentication frames to counter the UAV swarms. As with the centralized system, the two swarms act as if they have hit an invisible wall and a few drop out of the sky, while others stop in place and hover. Several more UAVs begin returning to their point of origin and self-land.

Meanwhile, back at the command center, the guard receives situation updates from the heads-up display showing the effects of the attack. As the guard is about to send in the situation update to higher headquarters, the tracking system identifies another UAV swarm approaching the southwest tower. The guard sends updated instructions to the Alphas before activating the jamming system, sending RF noise out of the tower's omnidirectional antennas to barrage jam the entire 5 GHz frequency band. The new UAV swarm stops, and the Alphas take a forward position to preemptively mitigate any new incoming threats. In the ensuing 10 minutes, a ground team captures five suspects on all-terrain vehicles carrying large briefcases filled with small UAVs and explosives.

Experiment Methodology

This section outlines the experiment methodology to take an operational concept such as aerial C-UAS patrols and turn it into a capability. The experimentation conducted and disclosed herein uses commercial equipment and open-source software to build a low-SWAP payload called the Detachable Drone Hijacker. The Detachable Drone Hijacker can be easily attached to a friendly UAV to a friendly UAV to identify, track, target, and deny an adversary's use of a WiFi UAV.

Prior to the building the Detachable Drone Hijacker, the research team conducted a feasibility assessment to determine which hardware and software would be required. Then, the team carried out three primary experiments to test and evaluate the concept of UAV-to-UAV interdiction using targeted cyber-attacks. Experiment One was an operational assessment of the effectiveness and power consumption of the Detachable Drone Hijacker at various ranges and elevation differentials. Experiment Two was a benchtop test designed to measure the survivability of the Detachable Drone Hijacker in sub-freezing temperatures. The final experiment, Experiment Three, measured the Detachable Drone Hijacker's thermal signature before, during, and after operation.

The purpose of the experiments were to evaluate the effectiveness, power consumption, and thermal signature of using cyber-attacks to counter commercial UAVs using the IEEE 802.11 wireless communication schemes. Three commercial UAVs were chosen based on their use of the IEEE 802.11 wireless communication standards—the PARROT ARDrone 2.0, PARROT Bebop, and SKYDIO 2+. The PARROT Bebop and the SKYDIO 2+ were secured with WPA2 and a pre-shared key. The PARROT ARDrone 2.0 could not be secured with WPA2.

Several attack vectors were identified based on the neutralization methods previously discussed. For experimentation purposes, the disclosed embodiment uses deauthentication and TCP/SYN Flood attacks while the RF electronic attack methods were excluded. The RF mitigation measures were omitted because of potential collateral damage to other systems operating in the 2.4 GHz and 5 GHz ISM bands, however these could be used in other applications. Additionally, these experiments focused low-SWaP mitigation techniques. Therefore, the large power consumption requirements associated with barrage jamming provide other challenges related to power/weight.

To evaluate the efficacy of such attacks against 802.11 UAVs, the following characteristics were measured: target behavior, distance between target and Detachable Drone Hijacker, power consumption associated with each attack method, and thermal signature.

Experiment Setup

The initial baseline testing used a laptop, an Alfa AWUS036ACH wireless NIC, a PARROT ARDrone 2.0, and software developed r to answer Research Questions 1, 2, and 3. During baseline testing, the primary outputs were the creation of software and logging scripts to automate the attack and record results. The software and logging scripts were especially important to create a repeatable process that allowed for easy data analysis.

Experiment One (Operational Field Testing) Setup

Experiment One consisted of field testing of the Detachable Drone Hijacker to simulate an operational use case to defend critical infrastructure against an adversarial UAV incursion. The Detachable Drone Hijacker was designed using the schematic in FIG. 1 and used the following hardware:

(1) RASPBERRY Pi 4.0 Model B, with 4 GB of Random Access Memory, used as the computer from which to control the experiments.

(1) SANDISK EXTREME 64 Gigabyte Micro-SD Card used to store the Raspbian Operating System and the software developed.

(1) RASPBERRY Pi Sense HAT Version 1.0 used for recording environmental characteristics.

(1) MAKERHAWK RASPBERRY Pi UPS Power Supply used as a power bank for the RASBERRY Pi.

(2) 18650 Rechargeable Batteries used to provide 5V of power to the RASBERRY Pi.

(1) ALFA AWUS036ACH WiFi NIC used as the radio from which to identify and target WiFi UAVs.

Figure 5:
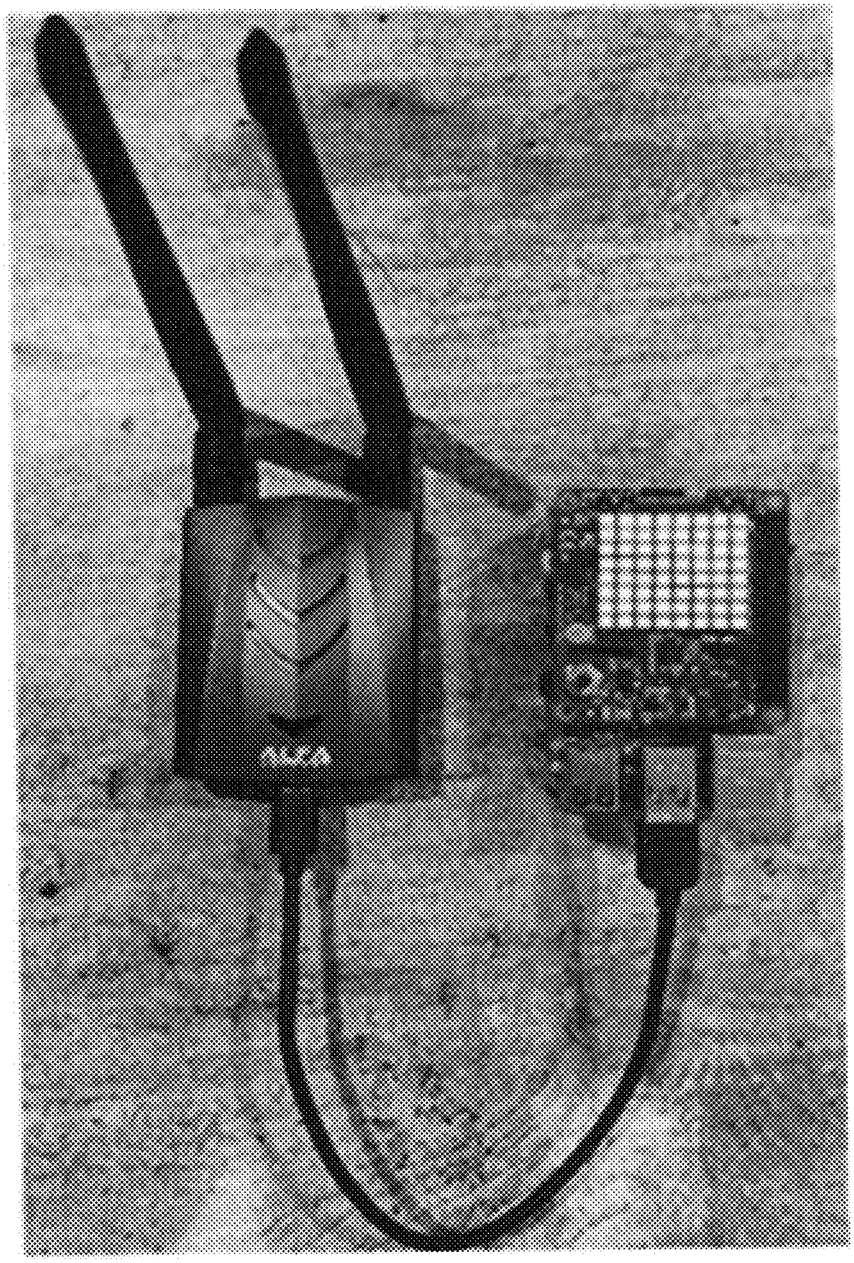
FIG. 5 shows a Detachable Drone Hijacker/Jammer Prototype according to an exemplary embodiment of this disclosure.

The final prototype was then fully assembled as seen in FIG. 5. Upon assembly, the research team attached a UM25C USB multimeter to take voltage, current, and power consumption readings during ground-to-air testing.

Figure 6:
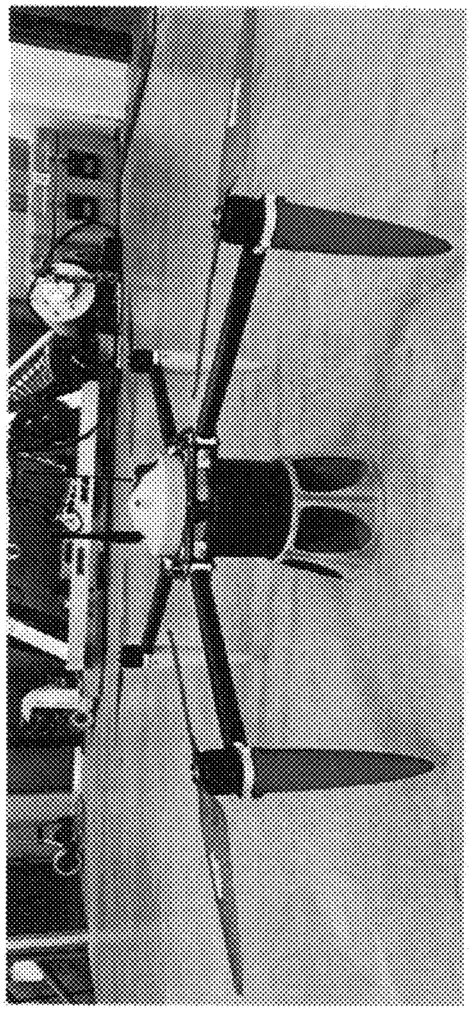
FIG. 6 shows an Aqua-Quad Drone.
Figure 7:
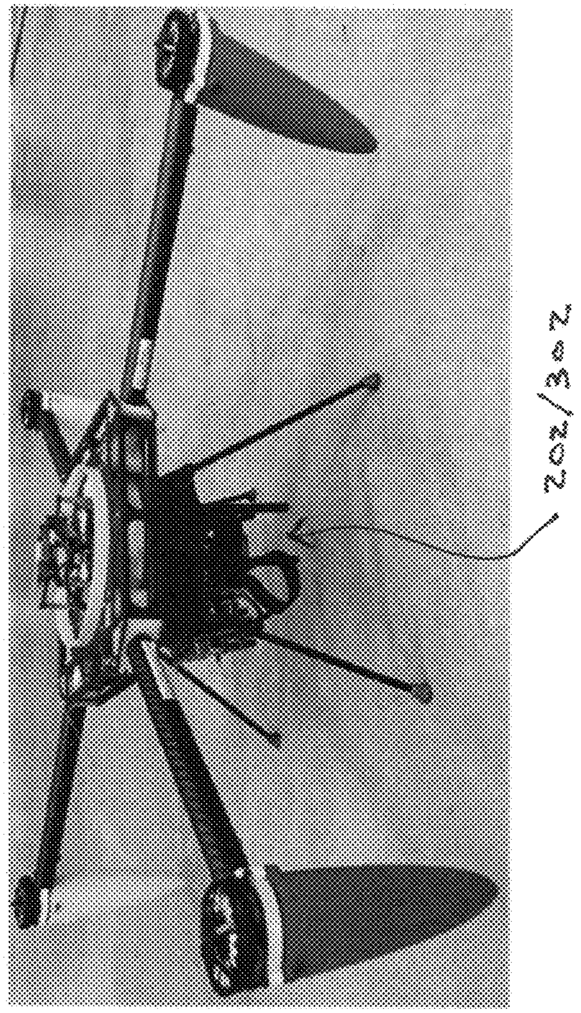
FIG. 7 shows a Detachable Drone Hijacker attached to its host, an Aqua-Quad, according to an exemplary embodiment of this disclosure.

Once the Detachable Drone Hijacker prototype was assembled, it was then attached to a host UAV called the Aqua-Quad. The Aqua-Quad is a larger Group 1 UAS with a configurable payload compartment as seen in FIGS. 6 and 7. FIG. 6 shows the Aqua-Quad configured for maritime launch and flight, while FIG. 7 shows the Aqua-Quad reconfigured for use with the Detachable Drone Hijacker.

Figure 8:
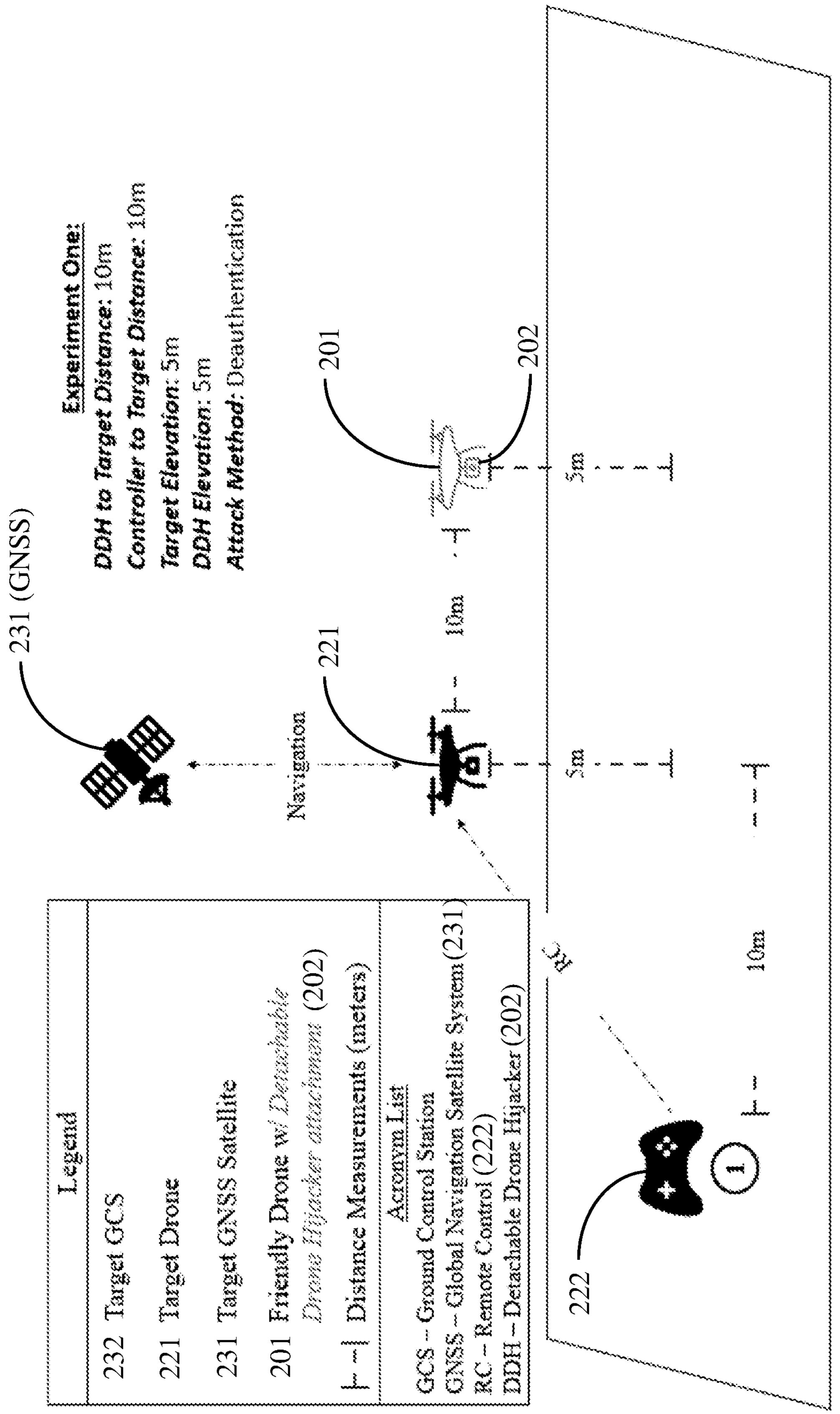
FIG. 8 shows Experiment One Set-up: Operational Field Testing.

All tests in Experiment One were carried out in accordance with the experiment diagram shown in FIG. 8. Notably, this diagram proved helpful in visualizing how the research team would control for certain variables such as the distance from the Detachable Drone Hijacker to the UAV target, attack method (e.g., deauthentication or TCP/SYN Flood), and the elevation of the Detachable Drone Hijacker and the UAV target. Then, quantifiable data was collected and organized in accordance with Table 1 below to measure the target UAV's behavior once attacked, the environmental conditions (such as humidity percentage, ambient temperature, and CPU temperature), power consumption, and thermal signature associated with each attack method.

TABLE 1

Experiment One Data Collection Table.

| | |
|---|---|
| Target | Average Power Consumption (W) |
| Target Behavior | Minimum Power Consumption (W) |
| GCS Behavior | Maximum Power Consumption (W) |
| DDH to Target Distance (m) | Average CPU Temperature (° C.) |
| GCS to Target Distance (m) | Minimum CPU Temperature (° C.) |
| Target Elevation (m) | Maximum CPU Temperature (° C.) |
| DDH Elevation (m) | Average Ambient Temperature (° C.) |
| Humidity (%) | Minimum Ambient Temperature (° C.) |
| | Maximum Ambient Temperature (° C.) |

Experiment Two (Sub-Freezing Temperature Testing) Setup

The research team decided to simulate future operating environments where the Detachable Drone Hijacker might be employed. Experiment Two was designed to simulate an environment where the Detachable Drone Hijacker is used during naval exercises in the Baltic Sea during the winter months, where average temperatures remain sub-zero for months on end.

Due to lab and equipment constraints, the Detachable Drone Hijacker was removed from the Aqua-Quad. Experiment Two sought to determine if the Detachable Drone Hijacker would remain operational in a sub-freezing environment where two tests were designed to mimic a scenario in which the Detachable Drone Hijacker moves in, and out, of a controlled temperature environment, as it would onboard a ship in a sub-freezing environment.

The first test held the Detachable Drone Hijacker at room temperature for five days and then brought it into sub-freezing temperatures for operations. The second test left the Detachable Drone Hijacker in a sub-freezing environment for 30 minutes and the third test left the Detachable Drone Hijacker in a sub-freezing environment for 60 minutes. With these controls in mind, quantifiable data was recorded and consolidated into a table as shown below (Table 2). This helped the research team understand the correlation between device functionality, CPU temperature, and ambient temperature.

TABLE 2

Experiment Two Data Collection Table.

| | |
|---|---|
| Target | Average CPU Temperature (° C.) |
| Target Behavior | Average Ambient Temperature (° C.) |
| GCS Behavior | Average Humidity (%) |
| H to Target Distance (m) | CPU Temp (° C.) |
| GCS to Target Distance (m) | Minimum Ambient Temp (° C.) |
| Target Elevation (m) | Maximum CPU Temp (° C.) |
| DDH Elevation (m) | Maximum Ambient Temp (° C.) |

Experiment Three (Thermography Testing) Setup

Thermal image testing, also known as thermography, is applied in the research and development of new technologies in many different industries. Whether it be nondestructive testing, condition monitoring, or reducing energy costs, the field of thermography has rapidly expanded alongside other information technologies throughout the past three decades. As it pertains to the development of aircraft and the systems which they employ, thermography is used to study propulsion systems, propellers, and is most useful when conducting SWaP analysis in aircraft payload development. This type of experimentation is especially important when the testing viability of EW systems that are employed onboard aircraft.

To carry out the thermography testing in Experiment Three, the research team used the following hardware and software systems for measurement: (1) FLIR A320 Tempscreen; (1) DELL INSPIRON Laptop; (1) Detachable Drone Hijacker Prototype; (1) FLIR CamTools 4.0.0 Software; The FLIR A320 Tempscreen is a thermal camera that is primarily used for temperature 85 deviation detection. The mobility of the camera makes it easy to employ almost anywhere for persistent monitoring of personnel, equipment, and infrastructure. The FLIR A320 was selected due to its ease of use, image quality, and accessibility to the research team. Of note, the FLIIR camera has a temperature accuracy of "+/−2° C. or +/−2% of the reading". The FLIR A320 THERMASCREEN camera enabled the research team to take static infrared images while noting the average temperatures associated with color transitions in the camera's software. This data was aggregated and recorded and shown in Table 3 below.

TABLE 3

Experiment Three Data Collection Table.

| Camera Look Angle | Power State | Test Mode | Color Code | Color Temperature (° C.) |
|---|---|---|---|---|
| Top | | Pre-Operational | White/Yellow | |
| Top | | Pre-Operational | Orange/Red | |
| Top | | Pre-Operational | Light Blue | |
| Top | | Pre-Operational | Dark Blue | |
| Front | | Pre-Operational | White/Yellow | |
| Front | | Pre-Operational | Orange/Red | |
| Front | | Pre-Operational | Light Blue | |
| Front | | Pre-Operational | Dark Blue | |
| Bottom | | Pre-Operational | White/Yellow | |
| Bottom | | Pre-Operational | Orange/Red | |
| Bottom | | Pre-Operational | Light Blue | |
| Bottom | | Pre-Operational | Dark Blue | |

Experiment Results and Discussion

To prove the viability of the air-to-air C-UAS disclosed herein, the research team carried out three main experiments. The primary goal was to create a payload that was small enough to be attached to a friendly host UAV without significant integration with the host's ship power or performance degradation. The Detachable Drone Hijacker is a $250 prototype weighing 400 grams designed to identify, target, and mitigate specified UAVs using the IEEE 802.11 wireless standards.

The three experiments outlined herein specifically target consumer UAVs operating on IEEE 802.11 WiFi channels. Before the experiments were conducted, baseline testing was needed to establish the viability of a cyber-attack against a UAV using WiFi communications. The UAV chosen was the PARROT ARDrone2.0, but because the UAV's software was outdated, it could not be flown while recording data. Thus, the ARDrone2.0 was only useful for initial testing and was omitted from the research findings.

After initial bench-top testing verified system functionality, Experiment One consisted of field testing the Detachable Drone Hijacker to mimic realistic conditions during ground-to-air, and air-to-air, operations. In Experiment Two, the research team sought to understand system performance of the Detachable Drone Hijacker in sub-freezing conditions. Finally, the thermography tests conducted in Experiment Three sought to understand the thermal characteristics associated with system operation before, during, and after use. Whether they be manned, or unmanned platforms, gathering thermographic data is especially important when integrating new payloads on existing aircraft.

Experiment One: Field Testing the Detachable Drone Hijacker

The following tests sought to test the operational employment of the Detachable Drone Hijacker on the ground and in the air.

Experiment One was carried out to simulate the operational employment of the Detachable Drone Hijacker while attached to a host device to counter a WiFi UAVs. The following proof of concept experiments were designed to:

- Determine effectiveness against the PARROT Bebop and SKYDIO 2+;
- Test DOS attacks in the form of TCP/SYN Flood and deauthentication attacks;

- Minimize power requirements for attacks; and
- Understand prototype limitations and SWAP requirements.

Execution

During initial testing, the TCP/SYN Flood attacks showed promise. However, when there are no established IP address gateways between the UAV target, its GCS, and the Detachable Drone Hijacker, TCP/SYN Flood attacks became untenable and less effective. More importantly, the main goal of testing was to reduce the amount of power required for each attack. And in this case, a DOS attack like the TCP/SYN flood is less computationally efficient than a deauthentication attack. For those reasons, the research team decided to omit the field testing of the TCP/SYN flood attacks. Thus, the preferred attack method proved to be the deauthentication DOS attack against the PARROT Bebop and the SKYDIO 2+.

Ground-to-Air Testing

During the first phase of field testing, the research team conducted seven ground-to-air tests targeting the PARROT Bebop. These tests evaluated the Detachable Drone Hijacker's ability to carry out its deauthentication attack with ground interference from trees, buildings, and power lines.

FIG. 8 gives a visual representation of the static experiments conducted at ranges of 10, 100, 250, and 400 meters between the Detachable Drone Hijacker 201; 202 and its target 221. These tests were conducted using the PARROT Bebop 2 as a target. The final test was a moving test in which the target drone 221 flew towards the Detachable UAV Hijacker 201 at varying heights and speeds to simulate an adversarial UAV attacking critical infrastructure. During the final air-to-air tests, the research team used the PARROT Bebop 2 and the SKYDIO 2+ as adversarial UAVs.

Power Consumption, Maximum Effective Range, CPU Temperature, Ambient Temperature, and Target Behavior were all Measured During Day One Testing.

Air-to-Air Testing

During the second phase of field experimentation, the research team conducted two air-to-air tests targeting the PARROT Bebop and the SKYDIO 2+. During air-to-air testing, the Aqua-Quad moved at various ranges from its ground control station at 40 meters of elevation while the elevation and range of the target UAVs was varied to simulate UAV-versus-UAV combat. The air-to-air tests measured CPU temperature, ambient temperature, and target behavior on of the air-to-air tests. Power consumption tests using the UM25C multimeter were omitted given the consistent results from prior experiments and the need to reduce payload weight. Additionally, max effective range tests were omitted due to facility constraints where the maximum distance between the Detachable Drone Hijacker and its target was 100 m.

Results and Discussion

Ground-to-Air Testing

Tables 4, 5 and 6 depict the ground-to-air test results. Of note, the power consumption associated with each test remained consistent, averaging approximately 1 Watt during all attacks.

TABLE 4

Ground-to-Air Field Test Five: Static Deauthentication Attack (250 m—Different Elevation).

| | | | |
|---|---|---|---|
| Target | Parrot Bebop | Average Power Consumption (W) | 1.1 |
| Target Behavior | Hovers then lands | Minimum Power Consumption (W) | 0.92 |
| GCS Behavior | Disconnected/No Control | Maximum Power Consumption (W) | 1.1 |
| DDH to Target Distance (m) | 250 | Average CPU Temperature (° C.) | 29.3 |
| GCS to Target Distance (m) | 10 | Minimum CPU Temperature (° C.) | 27.3 |
| Target Elevation (m) | 10 | Maximum CPU Temperature (° C.) | 33.1 |
| DDH Elevation (m) | 5 | Average Ambient Temperature (° C.) | 16.0 |
| Humidity (%) | 48.6 | Minimum Ambient Temperature (° C.) | 15.3 |
| | | Maximum Ambient Temperature (° C.) | 17.2 |

Despite a moderate amount of environmental clutter, the results from Test Five showed that the maximum effective range of the Detachable Drone Hijacker operated in ground-to-air mode is 250 meters. The Detachable Drone Hijacker had no issues identifying its target UAV and mitigating the threat using the deauthentication attack. Once the link was severed between the Bebop and the GCS, the UAV hovered, burning extra battery power to overcome the drag coefficient from vertical takeoff and the computational power needed to reconnect to its GCS. Lastly, the internal logging showed an 18.3° C. differential between the ambient temperature and the CPU temperature. This is important to note when attaching the Detachable Drone Hijacker onto a host-UAV where excess heat can cause malfunctions to normal operations.

TABLE 5

Ground-to-Air Field Test Six: Static Deauthentication Attack (400 m—Different Elevation).

| | | | |
|---|---|---|---|
| Target | Parrot Bebop | Average Power Consumption (W) | 1.1 |
| Target Behavior | No Effect | Minimum Power Consumption (W) | 0.92 |
| GCS Behavior | No Effect | Maximum Power Consumption (W) | 1.1 |
| DDH to Target Distance (m) | 400 | Average CPU Temperature (° C.) | 35.1 |
| GCS to Target Distance (m) | 10 | Minimum CPU Temperature (° C.) | 28.7 |
| Target Elevation (m) | 30 | Maximum CPU Temperature (° C.) | 38.5 |
| DDH Elevation (m) | 5 | Average Ambient Temperature (° C.) | 17.9 |
| Humidity (%) | 50.6 | Minimum Ambient Temperature (° C.) | 16.5 |
| | | Maximum Ambient Temperature (° C.) | 19.7 |

In Test Six, the research team attempted to extend the range of target identification to 400 m. However, due to environment clutter associated with power lines, buildings, trees, and free space path loss, the Detachable Drone Hijacker was unable to identify the target. The CPU and ambient temperature differential in this test showed a 13.3° C. delta, which is more favorable than the previous test. This is likely because of an increase in wind, which may have caused the CPU to cool faster than in previous tests.

TABLE 6

Ground-to-Air Field Test Seven: Moving Deauthentication Attack (250-100 m—Different Elevation).

| | | | |
|---|---|---|---|
| Target | Parrot Bebop | Average Power Consumption (W) | 1.1 |
| Target Behavior | Return to last known connection point | Minimum Power Consumption (W) | 0.93 |
| GCS Behavior | Disconnected/No Control | Maximum Power Consumption (W) | 1.1 |
| DDH to Target Distance (m) | 100-250 | Average CPU Temperature (° C.) | 34.6 |
| GCS to Target Distance (m) | N/A | Minimum CPU Temperature (° C.) | 30.7 |
| Target Elevation (m) | 10-20 | Maximum CPU Temperature (° C.) | 38.5 |
| DDH Elevation (m) | 5 | Average Ambient Temperature (° C.) | 19.5 |
| Humidity (%) | 43.6 | Minimum Ambient Temperature (° C.) | 19.0 |
| | | Maximum Ambient Temperature (° C.) | 20.0 |

In Test Seven, the research team created a scenario by which a target UAV attacked a building. Beginning at 250 meters and flying at 15 kilometers-per-hour at changing elevations towards the Detachable Drone Hijacker, the enemy UAV stopped in its place 80 m from its intended destination. The Detachable Drone Hijacker ran its automated attack process that begins with a scan of potential UAV targets in the area. Then, once a target is identified, it immediately hops to the same WiFi channel the target is operating on. Once the Detachable Drone Hijacker has successfully hopped to the target's channel, it immediately begins sending deauthentication frames to sever the connection between the adversarial UAV and its GCS. This entire process—from scanning for targets, to threat mitigation—occurs in a matter of less than 10 seconds. The attack process can be sped up by enabling the scanning functions of the Detachable Drone Hijacker to operate continuously, which reduces the attack timeline to less than a second.

Once attacked, the adversarial UAV begins hovering in place. Then it flew back to its launch point and finally it landed at the location where it last connected to its GCS, 100 m from its intended target. This movement, disconnection, and extra hovering made the target UAVs battery drain from 99% to 5% in an attack that lasted two minutes. Lastly, the differential between CPU operating temperature and ambient temperature was approximately 15° C.

Air-to-Air Testing

Figure 9A:
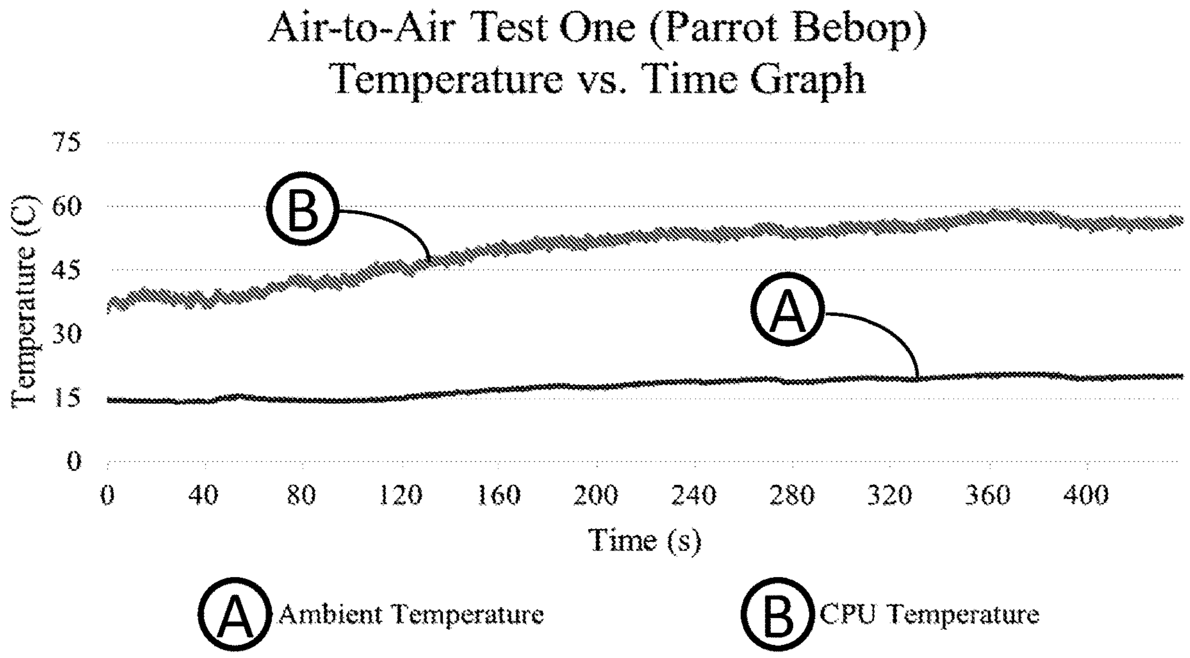
FIG. 9A shows results for Air-to-Air Test One: Difference between the Ambient and CPU Temperature (PARROT Bebop Target)
Figure 9B:
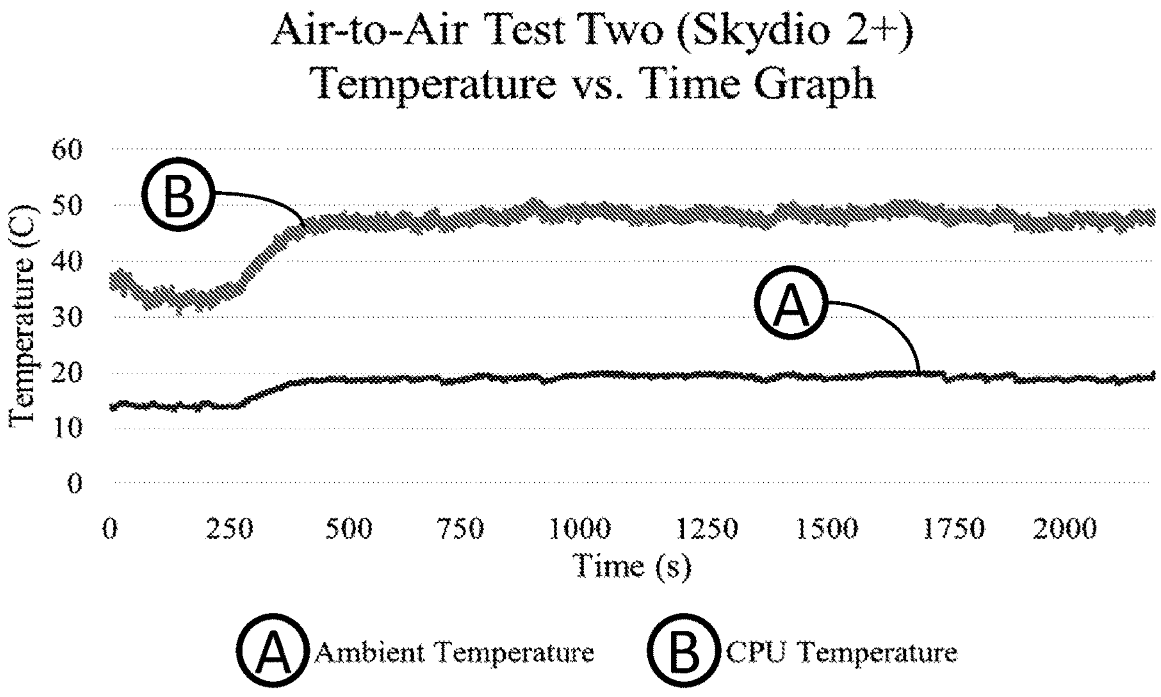
FIG. 9B shows results for Air-to-Air Test Two: Difference between the Ambient and CPU Temperature (SKYDIO 2+ Target).

During air-to-air testing, the Detachable Drone Hijacker to a host aircraft called the Aqua-Quad. Tables 7 and 8, as well as FIGS. 9A and 9B show the results from the air-to-air moving tests targeting a PARROT Bebop and SKYDIO 2+.

TABLE 7

Air-to-Air Test One: PARROT Bebop.

| | | | |
|---|---|---|---|
| Target | Parrot Bebop | Average CPU Temperature (° C.) | 32.4 |
| Target Behavior | Return to last known connection point | Minimum CPU Temperature (° C.) | 20.4 |
| GCS Behavior | Disconnected/No Control | Maximum CPU Temperature (° C.) | 38.5 |
| DDH to Target Distance (m) | Varied | Average Ambient Temperature (° C.) | 17.6 |
| GCS to Target Distance (m) | Varied | Minimum Ambient Temperature (° C.) | 13.9 |
| Target Elevation (m) | 10-30 | Maximum Ambient Temperature (° C.) | 20.6 |
| DDH Elevation (m) | 40 | Humidity (%) | 36.7 |

TABLE 8

Air-to-Air Test Two: SKYDIO 2+.

| | | | |
|---|---|---|---|
| Target | Skydio 2+ | Average CPU Temperature (° C.) | 27.6 |
| Target Behavior | Return to last known connection point | Minimum CPU Temperature (° C.) | 16.5 |
| GCS Behavior | Disconnected/No Control | Maximum CPU Temperature (° C.) | 31.6 |
| DDH to Target Distance (m) | Varied | Average Ambient Temperature (° C.) | 18.9 |
| GCS to Target Distance (m) | Varied | Minimum Ambient Temperature (° C.) | 13.4 |
| Target Elevation (m) | 10-30 | Maximum Ambient Temperature (° C.) | 48.3 |
| DDH Elevation (m) | 40 | Humidity (%) | 34.7 |

As one can see in the previous two tables, the Detachable Drone Hijacker proved effective in identifying, targeting, and mitigating threats at various distances and elevations while maintaining a low average temperature difference between the CPU and the ambient temperature. When attacked, both the PARROT Bebop and the SKYDIO 2+ returned back to their last known connection point, ultimately landing, while the GCS had no control or connection. While it only takes one deauthentication frame to initially disrupt the connection between the targeted UAV and its GCS, the Detachable Drone Hijacker is programmed to send 15 deauthentication frames, with 128 packets for each frame, to sever the link for enough time to cause the target UAVs to self-land. Because each UAV has different software functionality, actions a given UAV takes when the connection between a UAV and its GCS is disrupted also differ. In the case of these experiments, both the PARROT Bebop and the SKYDIO 2+ were preprogrammed to return to home after 15 seconds of disruption. Therefore, the connection only needed to be severed for 15 seconds to cause the drone to return to its point of origin.

The Detachable Drone Hijacker can easily be reprogrammed to send continuous deauthentication messages to the targeted UAV. As in the ground-to-air tests, the battery of target UAVs suffered a great deal from extensive hovering and processing power trying to reestablish connection. The Bebop's battery drained from 87% to 21%, while the battery of the SKYDIO 2+ proved more efficient with a battery that decreased from 85% to 71%.

Both FIGS. 9A and 9B highlight the ambient and CPU temperature changes to learn more about the thermal properties associated with attaching the Detachable Drone Hijacker to a host aircraft. Given the average results listed in the previous two tables, it was necessary to graph this differential over time. During the Parrot Bebop attack there was an average delta between the CPU and ambient TEMPERATURE of 15° C. while during the attack on the SKYDIO 2+, the average difference was 10° C. This is a noteworthy difference in precision between measurements because there are no differences in processes on the DDH when attacking the PARROT Bebop or the SKYDIO 2+. Therefore, future experiments should incorporate higher quality sensors than the RASBERRY Pi SENSHAT to gain more accurate insights into the temperature effects of running the deauthentication attack using the Detachable Drone Hijacker.

The preceding tests associated with Experiment One proved to be very promising as it pertains to the development of a future operational capability. Not only did the research team show that the system works against WPA2 encrypted targets, but this research showed that it is possible to deliver cyber-attacks to target an adversarial UAV from a friendly-UAV with no disruption to the surrounding environment. Additionally, the functions test using the Persistent Systems MPU5 identified ways to grow the current prototype into a networked family of systems.

Experiment Two: Static Sub-Freezing Temperature Testing

Experiment Two sought to simulate, in a restricted environment, an operational environment where the Detachable Drone Hijacker is employed on a ship deployed in the Arctic. Test One simulates storage inside the skin of a ship and employment in a sub-freezing environment. Then, Test Two simulated persistent operation in a sub-freezing environment for thirty minutes, while Test Three simulated persistent operations for 60 minutes. These bench-top tests are meant to inform future experiments in an alpine or arctic environment. This type of testing proves integral in the system design and engineering process used for low-rate initial production.

Experiment Two sought to understand the following information: The Detachable Drone Hijacker functionality in sub-freezing temperatures; The thermal characteristics associated with sub-freezing temperatures; and Any system limitations or degradation in sub-freezing temperatures.

Execution

To prevent frozen condensation interrupting any system operations during the sub-freezing tests, the Detachable Drone Hijacker was placed inside a one-gallon Ziploc bag with ten silicon desiccate packets for five days to absorb any system or environmental moisture. Because of environmental and range constraints, these static tests were carried out with the Detachable Drone Hijacker located inside of a commercial freezer. Thus, the target UAV could not be flown, which limited the research team's ability to observe the target's behavior in a sub-freezing environment. However, the GCS behavior was observed, and given the consistency of results from previous tests, it is safe to assume that the target UAV would hover in place and return to its point of origin after a preset time, in the event of a successful attack. The proceeding tests seek to measure the ambient temperature, CPU temperature, average humidity, and the ground control station's behavior once the attack occurs.

Sub-Zero Test One: Room Temperature to Sub-Zero Temperature

In sub-zero test one, the research team sought to simulate an operational use-case where the Detachable Drone Hijacker would be held in a temperature controlled environment and then employed in a sub-freezing environment. Due to freezer size constraints that limit the range of electromagnetic wave propagation, the Detachable Drone Hijacker was employed inside of a closed freezer that was located five meters away from its target, which was outside of the freezer. Test one initially stored the Detachable Drone Hijacker in a room temperature environment, then placed the Detachable Drone Hijacker in a freezer, with the door shut, for two minutes prior to attacking the target UAV from within the closed freezer. This attack was controlled by the ground station outside of the freezer.

Sub-Zero Test Two: Thirty Minutes of Sub-Zero Temperature

In sub-zero test two, the research team sought to simulate an operational use-case where the Detachable Drone Hijacker is powered on in an alpine or arctic environment. Much like test one, the freezer's size and doors constrained the range of electromagnetic wave propagation; thus, the Detachable Drone Hijacker was employed inside of a freezer, at a distance of five meters from its target, which was located outside of the freezer. The Detachable Drone Hijacker was placed in the closed freezer for 30 minutes prior to launching an attack against the target. Much like the first attack, the freezer door was shut and was the only physical obstacle between the Detachable Drone Hijacker and the target.

Sub-Zero Test Three: Sixty Minutes of Sub-Zero Temperature

In sub-zero test three, the research team extended the operational use-case where the Detachable Drone Hijacker is consistently powered on in an alpine or arctic environment for 60 minutes. All other controls from the previous sub-zero tests remained constant.

Results and Discussion

During this experiment, the pre-set temperature of the commercial freezer used was −13.9° C. However, the results tables show numbers vastly different from the operating temperature. That is likely due to the RASBERRY Pi's heat radiation which disrupts the SENSHAT's temperature sensors which causes an elevated ambient temperature output. Additionally, it is possible that the SENSHAT temperature sensors are damaged, giving faulty data. However, given the consistent range of data it is more likely to be thermal interference from the RASBERRY Pi's normal operation than a significant degradation to the SENSHAT sensors.

Figure 10A:
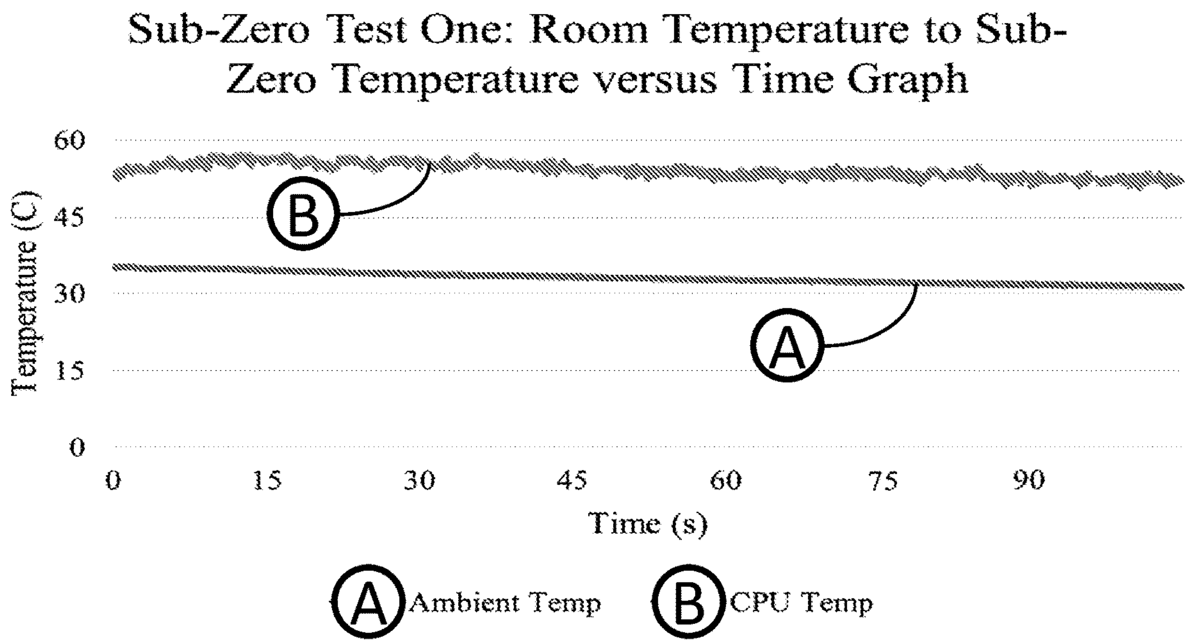
FIG. 10A shows Sub-Zero Test One: Room Temperature to Sub-Zero Graph.

Table 9 and FIG. 10A show the results from the first round of tests. As can be seen in Table 9, the target behavior could not be observed because both devices were indoors, but the Detachable Drone Hijacker was still able to sever the link of between the target UAV and its GCS. Therefore, in an operational environment, the target UAV would hover and return to its point of origin, just as it did during the field tests conducted in Experiment One.

TABLE 9

Sub-Zero Test One: Room Temperature to Sub-Zero Temperature.

| | | | |
|---|---|---|---|
| Target | Parrot Bebop | Average CPU Temperature (° C.) | 54.1 |
| Target Behavior | Could not be observed | Average Ambient Temperature (° C.) | 33.1 |
| GCS Behavior | Disconnected/No Control | Average Humidity (%) | 15.7 |
| DDH to Target Distance (m) | 5 | CPU Temp (° C.) | 50.6 |
| GCS to Target Distance (m) | 0 | Minimum Ambient Temp (° C.) | 31.3 |
| Target Elevation (m) | 0 | Maximum CPU Temp (° C.) | 57.0 |
| DDH Elevation (m) | 0 | Maximum Ambient Temp (° C.) | 35.2 |

Figure 10B:
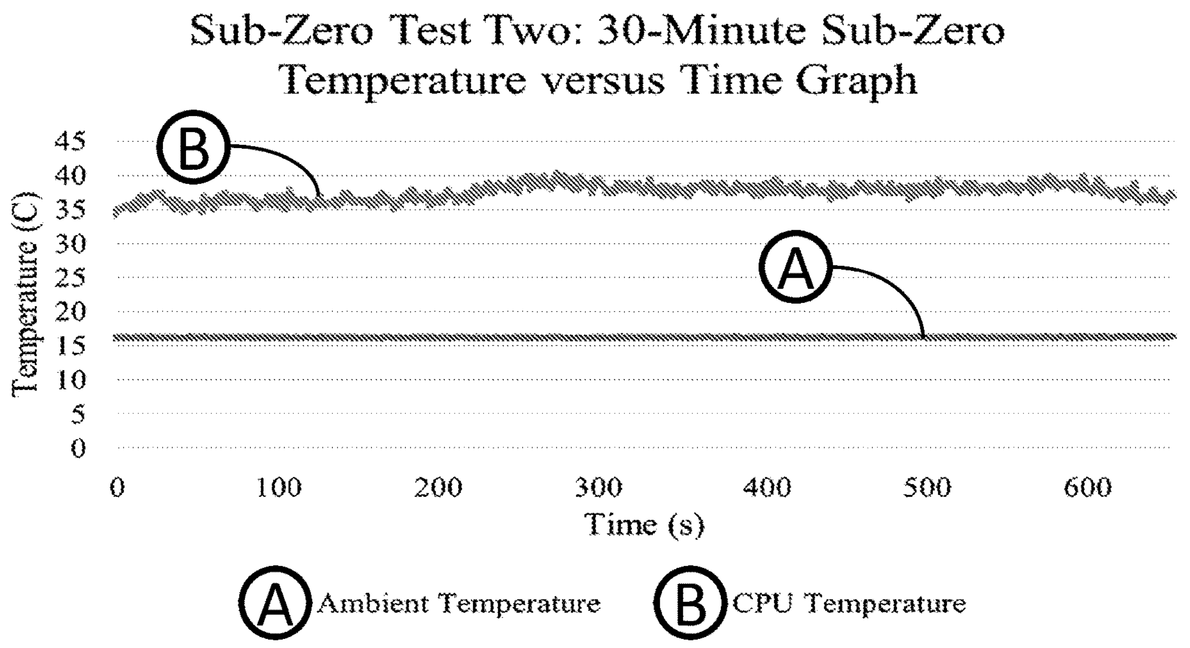
FIG. 10B shows Sub-Zero Test Two: 30-Minute Sub-Zero Temperature Graph.

Table 10 and FIG. 10B show the results from the second round of tests in a sub-freezing environment. This test sought to emulate a scenario when the Detachable Drone Hijacker is attached to a host UAV during operations for an extended period of time. As Table 10 shows, operations were not degraded, and the Detachable Drone Hijacker successfully severed the link between the target and its GCS.

TABLE 10

Sub-Zero Test Two: Thirty Minutes of Sub-Zero Temperature

| | | | |
|---|---|---|---|
| Target | Parrot Bebop | Average CPU Temperature (° C.) | 37.5 |
| Target Behavior | Could not be observed | Average Ambient Temperature (° C.) | 16.2 |
| GCS Behavior | Disconnected/No Control | Average Humidity (%) | 15.7 |
| DDH to Target Distance (m) | 5 | CPU Temp (° C.) | 34.1 |
| GCS to Target Distance (m) | 0 | Minimum Ambient Temp (° C.) | 16.1 |
| Target Elevation (m) | 0 | Maximum CPU Temp (° C.) | 40.4 |
| DDH Elevation (m) | 0 | Maximum Ambient Temp (° C.) | 16.4 |

Figure 10C:
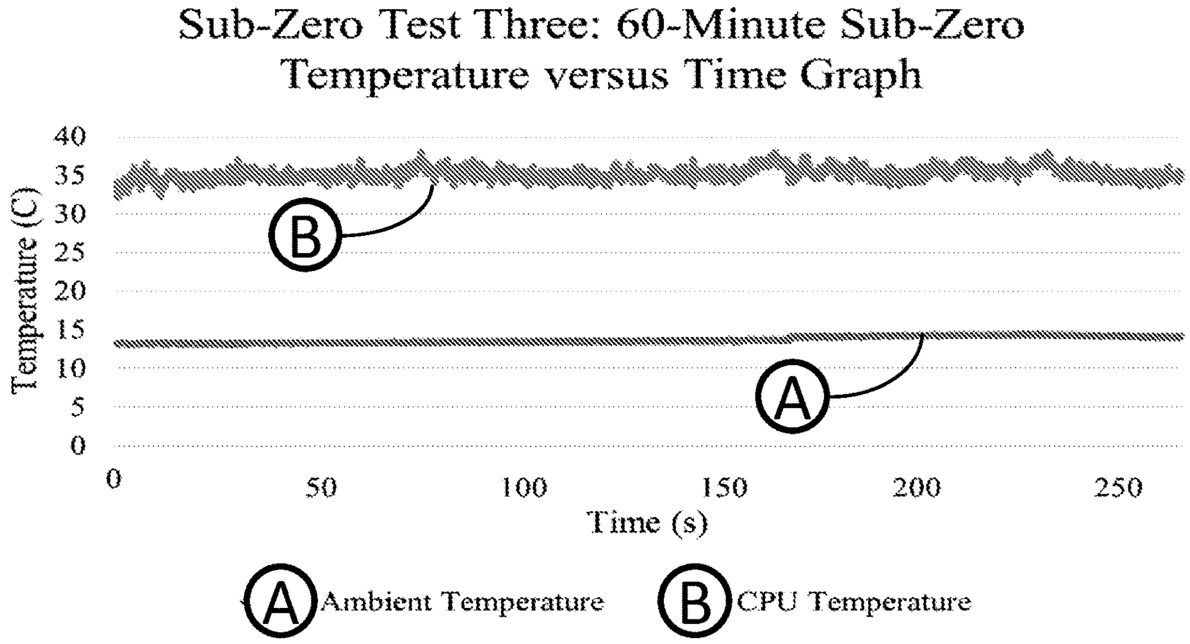
FIG. 10C shows Sub-Zero Test Three: 60-Minute Sub-Zero Temperature Graph.

Table 11 and FIG. 10C represent the third sub-zero test conducted. In this test, the Detachable Drone Hijacker was left in the freezer for sixty-minutes to simulate an operation where the device was powered continuously in a sub-freezing environment. This could be an operational use-case in the Baltics as before, or during winter operations in the Pacific Northwest. It is here where the Detachable Drone Hijacker failed to sufficiently sever the link between the target and its GCS. The Detachable Drone Hijacker had no problem identifying its target, but it could not switch to the correct channel to send the deauthentication frames to its target. This is most likely due to sluggish operations that occur in extreme cold temperatures. In an operational environment, the Detachable Drone Hijacker would need to have a protective case to ensure that moisture and other cold weather-related issues do not hamper operations.

TABLE 11

Sub-Zero Test Three: Sixty Minutes of Sub-Zero Temperature.

| | | | |
|---|---|---|---|
| Target | Parrot Bebop | Average CPU Temperature (° C.) | 35.4 |
| Target Behavior | Could not be observed | Average Ambient Temperature (° C.) | 13.7 |
| GCS Behavior | Detection Only | Average Humidity (%) | 18.3 |
| DDH to Target Distance (m) | 5 | CPU Temp (° C.) | 33.5 |
| GCS to Target Distance (m) | 0 | Minimum Ambient Temp (° C.) | 13.5 |
| Target Elevation (m) | 0 | Maximum CPU Temp (° C.) | 37.7 |
| DDH Elevation (m) | 0 | Maximum Ambient Temp (° C.) | 13.6 |

Experiment Three: Static Thermal Testing

Experiment Three consisted of thermal image testing of the Detachable Drone Hijacker prototype before, during, and after operations.

The goal of Experiment Three was to measure the thermal signature associated with the Detachable Drone Hijacker and determine the tradeoffs that may be associated with the use of a lightweight, low power consuming C-UAS prototype. This information will help future researchers test and evaluate the viability of the cyber-attack methods outlined in Experiment One.

Execution

Figure 11A:
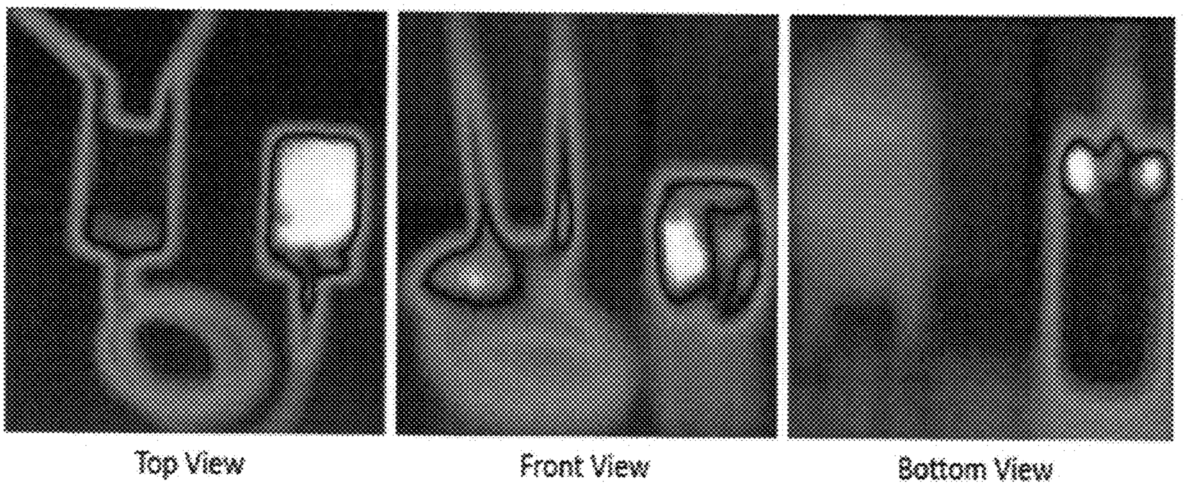
FIG. 11A shows Thermal Test One: Mode OFF, Pre-Operations.
Figure 11B:
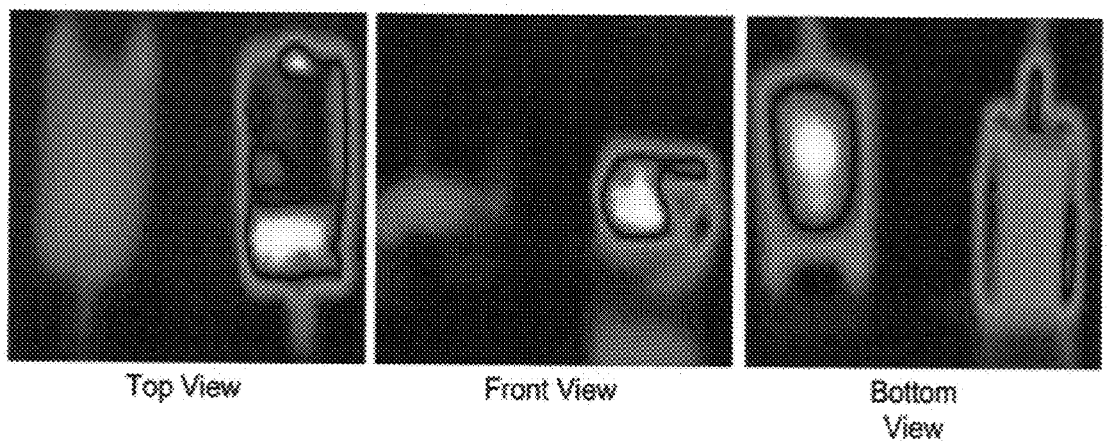
FIG. 11B shows Thermal Test Two: Mode ON, During Operations (5 Minutes Active)
Figure 11C:
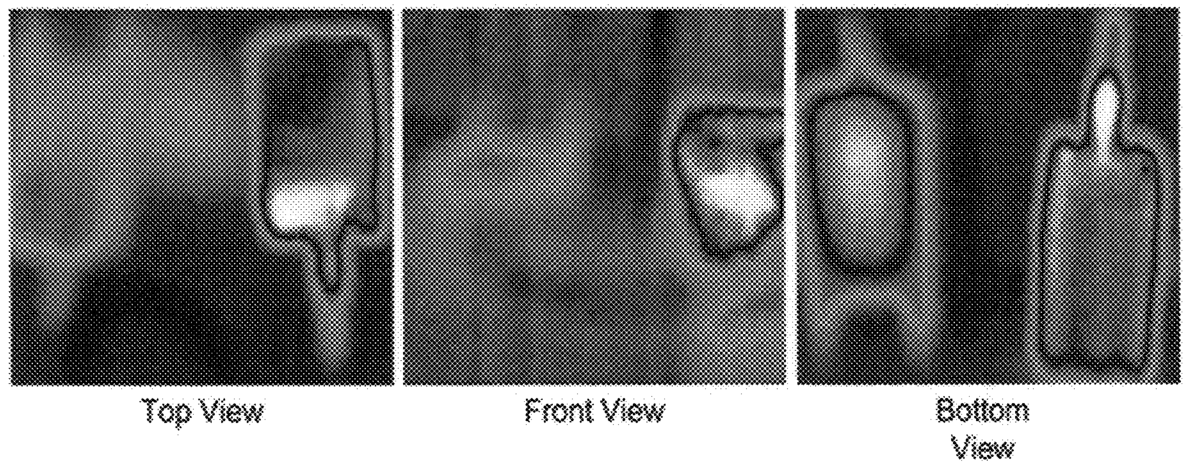
FIG. 11C shows Thermal Test Three: Mode OFF, Post-Operations.

Throughout this experiment, still images were taken (one meter away from the Detachable Drone Hijacker) and analyzed by the research team. It was desirable to get separate measurements at different angles to best determine the temperature associated with each phase of operation. Thus, still images were taken from top-down, front, and bottom-up angles before, during, and after system operation. FIG. 11A is associated with Thermal Test One: Mode OFF, Pre-Operations; FIG. 11B is associated with Thermal Test Two: Mode ON, During Operations (5 Minutes Active); and FIG. 11C is associated with Thermal Test Three: Mode OFF, Post-Operations.

Results and Discussion

Table 12 shows the temperature catalogues of the Detachable Drone Hijacker before operations. These still images show a system that stores and radiates thermal energy even when not operational. While not pertinent for this disclosure, if further production of this device occurs, determining the thermal signature of the Detachable Drone Hijacker at farther distances as this would be important for units who require low-signature for their operations.

TABLE 12

Thermal Test One Results: Mode OFF, Pre-Operations.

| Camera Look Angle | Power State | Test Mode | Color Code | Color Temperature (° C.) |
|---|---|---|---|---|
| Top | OFF | Pre-Operations | White/Yellow | 26.6 |
| Top | OFF | Pre-Operations | Orange/Red | 24.6 |
| Top | OFF | Pre-Operations | Light Blue | 22.5 |
| Top | OFF | Pre-Operations | Dark Blue | 20.5 |
| Front | OFF | Pre-Operations | White/Yellow | 21.7 |
| Front | OFF | Pre-Operations | Orange/Red | 21.3 |
| Front | OFF | Pre-Operations | Light Blue | 20.6 |
| Front | OFF | Pre-Operations | Dark Blue | 19.7 |
| Bottom | OFF | Pre-Operations | White/Yellow | 22.3 |
| Bottom | OFF | Pre-Operations | Orange/Red | 21.5 |
| Bottom | OFF | Pre-Operations | Light Blue | 20.5 |
| Bottom | OFF | Pre-Operations | Dark Blue | 19.5 |

Table 13 shows that after five minutes of operations, the temperature of the Detachable Drone Hijacker increases by only 3.3° C. This is extremely promising given the need to integrate the Detachable Drone Hijacker onto another aerial platform. This varies significantly from the in-flight temperature measurements for several reasons. First, it is possible that this disparity comes from the SENSHAT on the RASBERRY Pi, which possibly gave faulty temperature measurements. This temperature disparity may also be due to the fact that the FLIR A320 is primarily meant for surface monitoring of systems, not CPU monitoring like the SENSHAT and the internal monitors on the RASBERRY Pi.

TABLE 13

Thermal Test Two Results: Mode ON, 5 Minutes Active.

| Camera Look Angle | Power State | Test Mode | Color Code | Color Temperature (° C.) |
|---|---|---|---|---|
| Top | ON | During Operation (5 Minutes Active) | White/Yellow | 29.8 |
| Top | ON | During Operation (5 Minutes Active) | Orange/Red | 27.7 |
| Top | ON | During Operation (5 Minutes Active) | Light Blue | 23.7 |
| Top | ON | During Operation (5 Minutes Active) | Dark Blue | 20.2 |
| Front | ON | During Operation (5 Minutes Active) | White/Yellow | 30.3 |
| Front | ON | During Operation (5 Minutes Active) | Orange/Red | 27.3 |
| Front | ON | During Operation (5 Minutes Active) | Light Blue | 22.5 |
| Front | ON | During Operation (5 Minutes Active) | Dark Blue | 19.7 |
| Bottom | ON | During Operation (5 Minutes Active) | White/Yellow | 30.5 |
| Bottom | ON | During Operation (5 Minutes Active) | Orange/Red | 27.3 |
| Bottom | ON | During Operation (5 Minutes Active) | Light Blue | 23.8 |
| Bottom | ON | During Operation (5 Minutes Active) | Dark Blue | 20.2 |

Table 14 shows that after only five minutes of cool down time, the Detachable Drone Hijacker returns to its pre-operational temperature. This is important as the system cannot continue to expend excess heat after use or else there may be deleterious effects to the host-UAV.

TABLE 14

Thermal Test Three Results: Mode OFF, 5 Minutes Post-Operations.

| Camera Look Angle | Power State | Test Mode | Color Code | Color Temperature (° C.) |
|---|---|---|---|---|
| Top | OFF | 5-Minutes Post Operations | White/Yellow | 25.2 |
| Top | OFF | 5-Minutes Post Operations | Orange/Red | 24.2 |
| Top | OFF | 5-Minutes Post Operations | Light Blue | 21.9 |
| Top | OFF | 5-Minutes Post Operations | Dark Blue | 20.3 |
| Front | OFF | 5-Minutes Post Operations | White/Yellow | 22.2 |
| Front | OFF | 5-Minutes Post Operations | Orange/Red | 21.4 |
| Front | OFF | 5-Minutes Post Operations | Light Blue | 20.4 |
| Front | OFF | 5-Minutes Post Operations | Dark Blue | 20.1 |
| Bottom | OFF | 5-Minutes Post Operations | White/Yellow | 23.8 |
| Bottom | OFF | 5-Minutes Post Operations | Orange/Red | 23.1 |
| Bottom | OFF | 5-Minutes Post Operations | Light Blue | 21.7 |
| Bottom | OFF | 5-Minutes Post Operations | Dark Blue | 20.2 |

Conclusion

In sum, the results from the thermal camera tests differed greatly from those carried out in Experiment One and Experiment Two. This variation could be from sensor placement or inaccuracies in the SENSHAT or from inaccuracies in the FLIR A320. However, the documentation provided for the FLIR A320 is more substantial than the documentation available for the SENSHAT which seems to suggest that validation data from the former may be more substantial than the latter. However, for low-rate initial production and system development, further thermal characteristic testing should be carried out. Lastly, depending on host-device integration specifications, if there is a concern over heat properties, it is recommended to build a cool-down mechanism for the Detachable Drone Hijacker.

As the three preceding experiments show, it is possible to create a system that are personalized to create a decentralized web of devices that can identify, track, target, and mitigate unwanted UAVs.

This disclosure, and the exemplary embodiments described herein, provide a networked squadron of UAVs designed for aerial interdiction with devices such as the Detachable Drone Hijacker present a novel way to counter the UAV threats.

The field testing was promising and showed that the concept is viable, while the sub-zero tests proved that the Detachable Drone Hijacker can be employed in multiple operating environments. With an average temperature increase of only 3.3 degrees Celsius, the thermal signature experiments also proved that when integrated onboard another aircraft, the Detachable Drone Hijacker has minimal effect to the host device.

Notably, the experiments conducted show that by using only commercial technology, it is possible to build a C-UAS device designed for aerial interdiction. From the baseline prototype development and aerial experiments to the sub-zero and thermal testing, the Detachable Drone Hijacker can move toward development of a concept into a capability.

In summary, the C-UAS market remains nascent and ripe for disruption. High-performance computer modules are getting smaller and consuming less power while increasing in capability. Companies developing C-UAS technologies should refocus their efforts on harnessing high-performance with low-SWaP to create less expensive, but more capable C-UAS devices. This disclosure, including the experiments using the Detachable Drone Hijacker, prove that it is possible to deliver an aerial cyber-attack against multiple UAVs with minimal effect on the host device. This framework is not meant to usurp the current methodology but is meant to augment and increase the effectiveness of C-UAS technology to meet the needs of the operating environment.

Described below are some examples of amounting arrangement for securing a portable detachable/attachable drone hijacker/jammer, as previously described, to an unmanned vehicle. It is to be understood that the example mounting arrangements are provided only as examples and other mounting arrangements are within the scope of this disclosure.

Figure 12A:
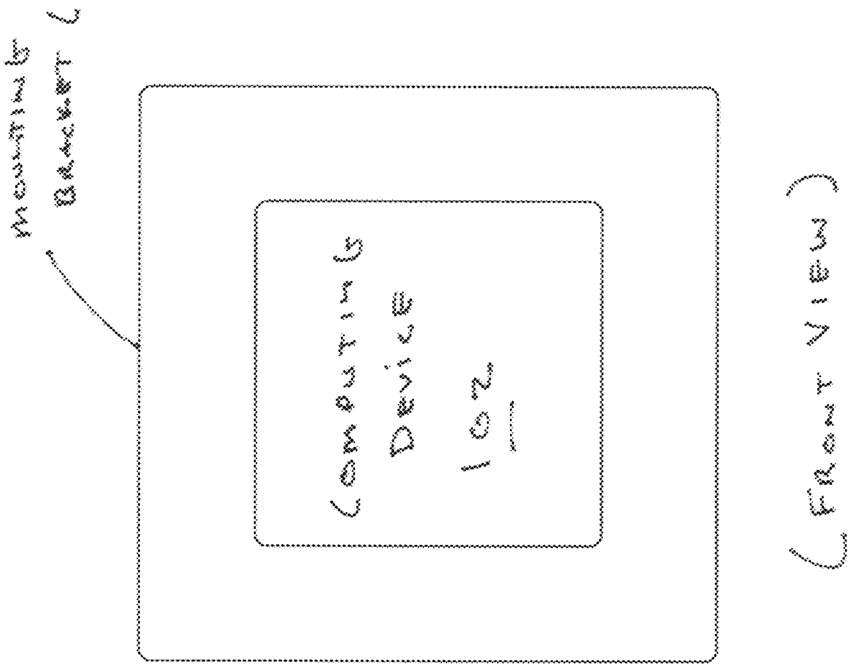
FIG. 12A, FIG. 12B and FIG. 12C show a mounting arrangement 401/402 according to an exemplary embodiment of this disclosure.
Figure 12B:
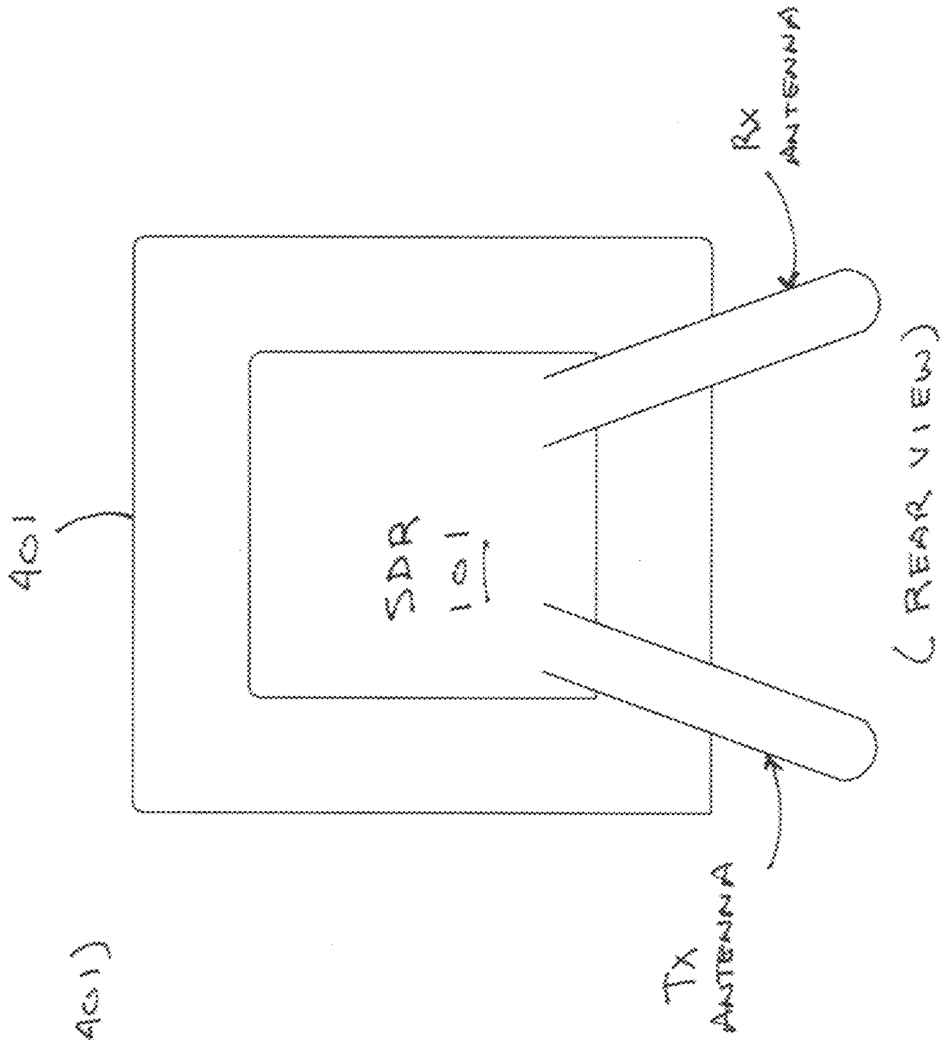
Figure 12C:
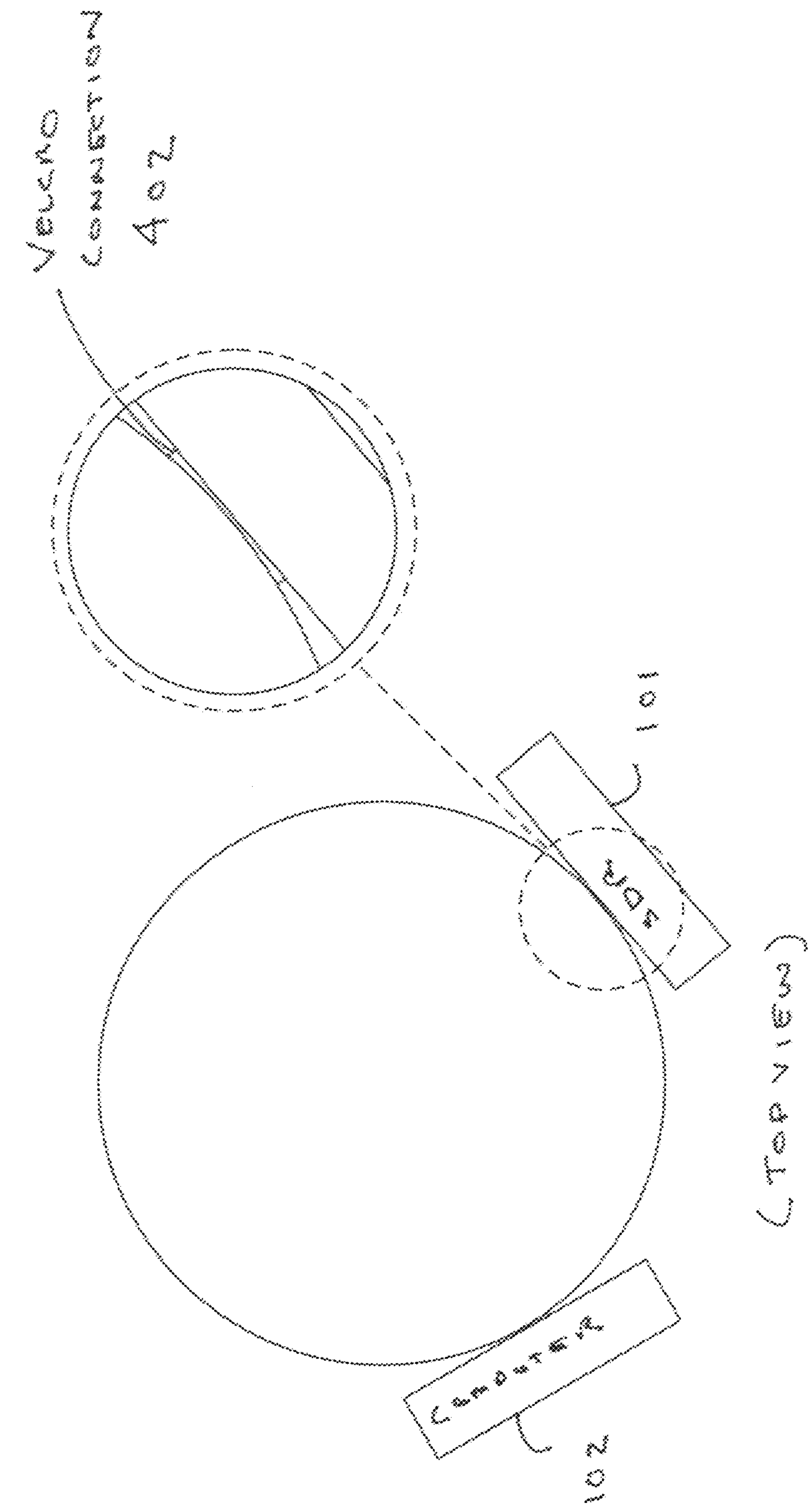

With reference to FIG. 12A, FIG. 12B and FIG. 12C, shown is a mounting arrangement 401/402 according to an exemplary embodiment of this disclosure. FIG. 12A is a front view of a mounting bracket 401, FIG. 12B is a rear view the mounting bracket 401 and FIG. 12C is a top view of a hook-n-loop mounting arrangement 402. As shown, according to this arrangement, a computing device 102 is mounted on one side of a mounting plate and the SDR 101 is mounted on the opposite side of the mounting plate 401. The bracket 401 may be an integral part of the unmanned vehicle or, alternatively mounted to an existing payload mounting configuration (bolt on, clip, etc.) which is part of the unmanned vehicle. FIG. 12C shows a mounting arrangement which uses a hook-n-loop attachment means 402 to secure the computer 102 and SDR 101 to the unmanned vehicle.

Figure 13A:
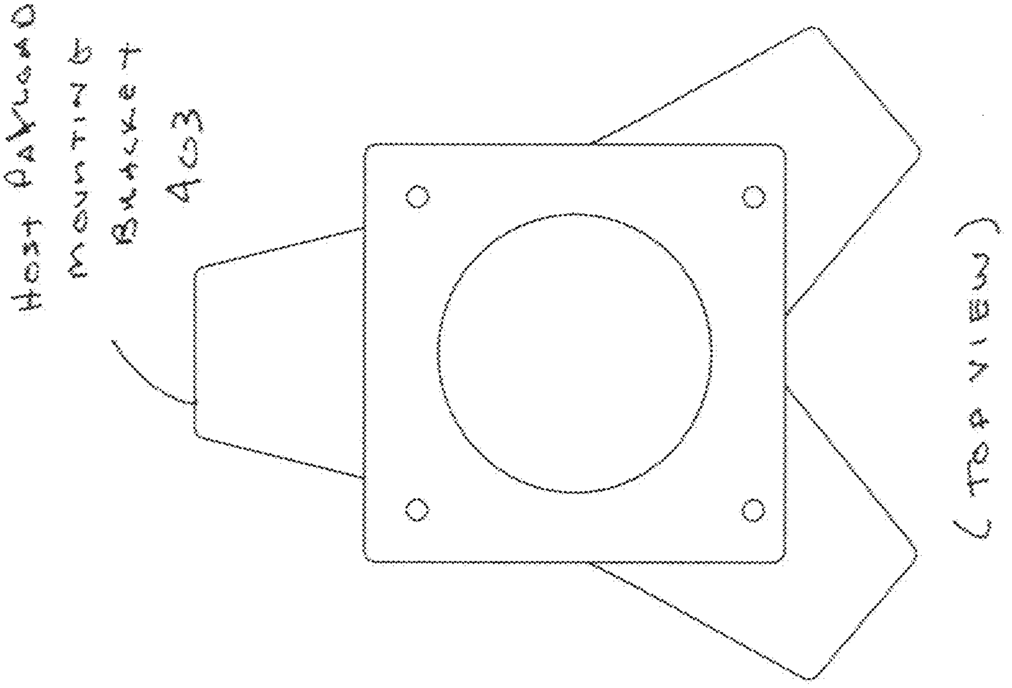
FIGS. 13A and 13B show another mounting arrangement 403 according to an exemplary embodiment of this disclosure.
Figure 13B:
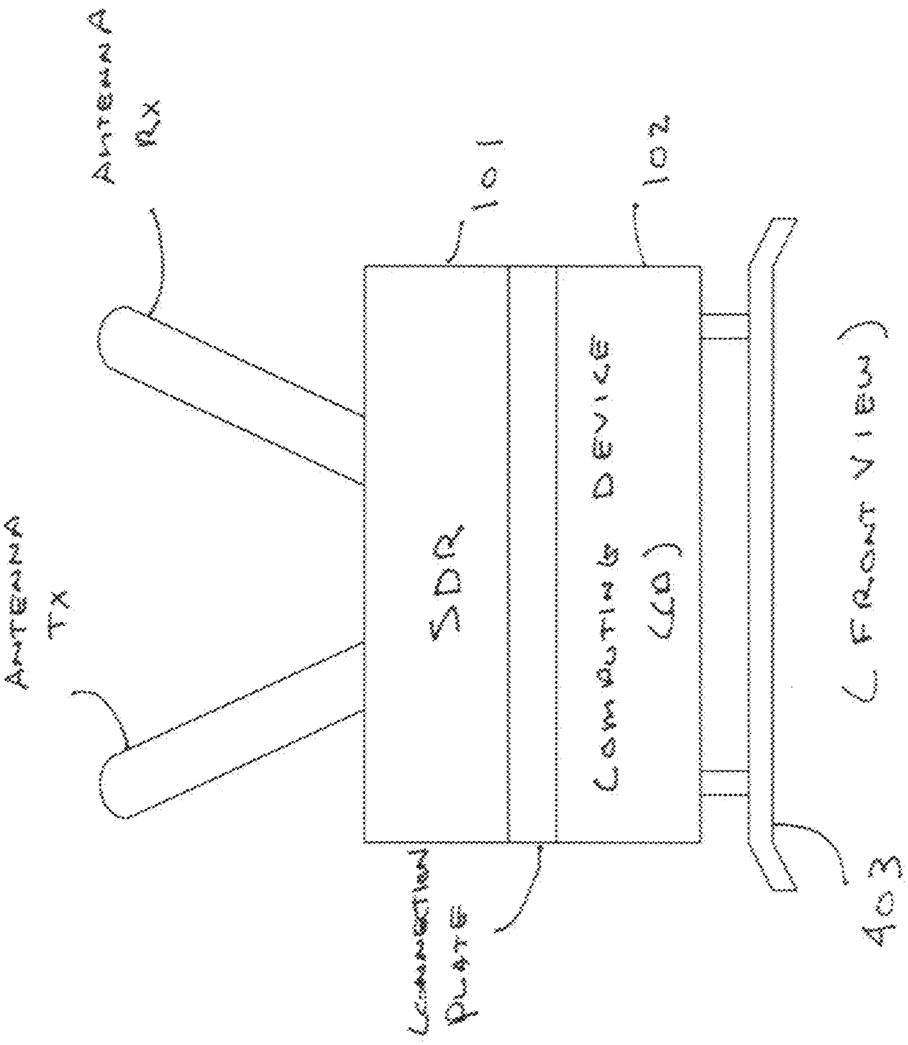

With reference to FIGS. 13A and 13B, shown is another mounting arrangement 403 according to an exemplary embodiment of this disclosure, including an unmanned vehicle payload bracket 403 which attaches to an assembly including an SDR 101 and CD 102.

Figure 14:
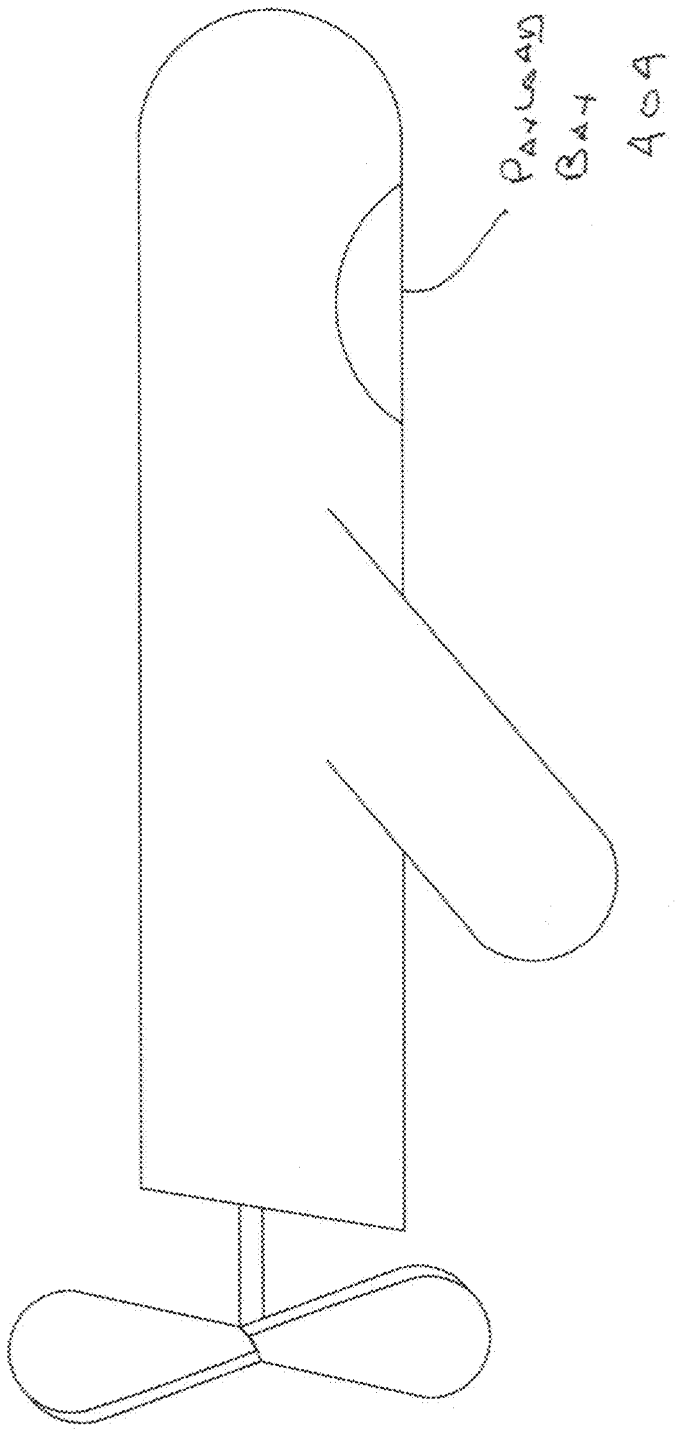
FIG. 14 shows a payload area 404 associated with an unmanned vehicle which functions as a mounting arrangement for a portable detachable/attachable drone hijacker/jammer according to an exemplary embodiment of this disclosure.

With reference to FIG. 14, shown is a payload area 404 associated with an unmanned vehicle which functions as a mounting arrangement for a portable detachable/attachable drone hijacker/jammer according to an exemplary embodiment of this disclosure.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A portable detachable drone hijacker operatively associated with a friendly unmanned vehicle, the detachable drone hijacker comprising:

a mount to attach and detach the detachable drone hijacker to a friendly unmanned vehicle, the mount adapted to attach and detach to a mount operatively associated with the unmanned vehicle;

a receiving antenna to receive an instruction set for attacking a target drone and a signal of interest associated with the target drone;

a transmitting antenna to transmit attack signals at the target drone;

a software defined radio to generate the attack signals that are compatible with the target drone; and a processor to control the software defined radio and the transmitting antenna to attack the target drone according to the instruction set, wherein the detachable drone hijacker is a discrete device mounted on a surface of the friendly unmanned vehicle and the detachable drone hijacker is completely operationally independent from the operation of the friendly unmanned vehicle and any associated electronics to operate the unmanned vehicle.

2. The portable detachable drone hijacker according to claim 1, wherein the unmanned vehicle is one of an unmanned aircraft vehicle, a drone, an aquacopter, and an unmanned underwater vehicle and an unmanned surface vehicle.

3. The portable detachable drone hijacker according to claim 1, wherein the mount is one of a bolt-on mount and a clip on mount, and the mount is configured to attach and detach from the mount operatively associated with the unmanned vehicle.

4. The portable detachable drone hijacker according to claim 1, further comprising:

a power supply independent from any power supply associated with the unmanned friendly vehicle.

5. The portable detachable drone hijacker according to claim 1, wherein the receiving antenna and transmitting antenna are one or more of independent antennas, a discrete antenna, an omnidirectional antenna, and a directional antenna.

6. The portable detachable drone hijacker according to claim 1, wherein the detachable drone hijacker exploits vulnerabilities in the target drone communication protocol design and conducts a cyber-attack including one or more of Global Navigation Satellite System (GNSS) spoofing, a user datagram protocol (UDP) flood attack, a denial-of-service (DOS) attack, a deauthentication attack, a controller communication link eavesdropping attack, and a telemetry link spoofing or hijacking attack.

7. The portable detachable drone hijacker according to claim 1, wherein the detachable drone hijacker targets target drones that use one or both of frequency hopping spread spectrum (FHSS) and direct sequence spread spectrum (DSSS) modulation schemes.

8. A portable detachable drone jammer operatively associated with a friendly unmanned vehicle, the detachable drone jammer comprising:

a mount to attach and detach the detachable drone jammer to a friendly unmanned vehicle, the mount adapted to attach and detach to a mount operatively associated with the unmanned vehicle;

a receiving antenna to receive an instruction set for attacking a target drone and radio frequency links of interest associated with the target drone;

a transmitting antenna to transmit attack signals at the target drone;

a software defined radio to generate the attack signals that are compatible with the target drone; and a processor to control the software defined radio and the transmitting antenna to attack the radio frequency links used by the target drone according to the instruction set, wherein the detachable drone jammer is a discrete device mounted on a surface of the friendly unmanned vehicle and the detachable drone jammer is completely operationally independent from the operation of the friendly unmanned vehicle and any associated electronics to operate the unmanned vehicle.

9. The portable detachable drone jammer according to claim 8, wherein the unmanned vehicle is one of an unmanned aircraft vehicle, a drone, an aquacopter, and an unmanned underwater vehicle and an unmanned surface vehicle.

10. The portable detachable drone jammer according to claim 8, wherein the mount is one of a bolt-on mount and a clip on mount, and the mount is configured to attach and detach from the mount operatively associated with the unmanned vehicle.

11. The portable detachable drone jammer according to claim 8, further comprising:

a power supply independent from any power supply associated with the unmanned friendly vehicle.

12. The portable detachable drone jammer according to claim 8, wherein the receiving antenna and transmitting antenna are one or more of independent antennas, a discrete antenna, an omnidirectional antenna, and a directional antenna.

13. The portable detachable drone jammer according to claim 8, wherein the detachable drone jammer attacks the radio frequency links on the target device that control one or more of the target drone's telemetry, video, remote control, data transmission, and navigation.

14. The portable detachable drone jammer according to claim 8, wherein the detachable drone jammer implements and executes combinations or subsets of the following electronic attack techniques: Broadband noise jamming, Partial band noise jamming, Sweep jamming, Tone and/or multi-tone jamming, Pulse jamming, Follower jamming, and Protocol aware partial dwell jamming.

15. The portable detachable drone jammer according to claim 8, wherein the detachable drone jammer targets target drones that use one or both of frequency hopping spread spectrum (FHSS) and direct sequence spread spectrum (DSSS) modulation schemes.

16. A drone hijacker system operatively associated with attacking unmanned target vehicles, the drone hijacker system comprising:

a ground control station including one or more base antennas; and a plurality of portable detachable drone hijackers operatively associated with a plurality of respective friendly unmanned vehicle, each detachable drone hijacker comprising:

a mount to attach and detach the detachable drone hijacker to the respective friendly unmanned vehicle, the mount adapted to attach and detach to a mount operatively associated with the unmanned vehicle;

a receiving antenna to receive an instruction set from the ground control station for attacking the unmanned target vehicle and a signal of interest associated with the unmanned target vehicle drone;

a transmitting antenna to transmit attack signals at the unmanned target vehicle;

a software defined radio to generate the attack signals that are compatible with the unmanned target vehicle; and a processor to control the software defined radio and the transmitting antenna to attack the unmanned target vehicle according to the instruction set, wherein the detachable drone hijacker is a discrete device mounted on a surface of the friendly unmanned vehicle and the detachable drone hijacker is completely operationally independent from the operation of the friendly unmanned vehicle and any associated electronics to operate the unmanned vehicle.

17. The drone hijacker/jammer system according to claim 16, wherein the detachable drone hijacker exploits vulnerabilities in the unmanned target vehicle communication protocol design and conducts a cyber-attack including one or more of Global Navigation Satellite System (GNSS) spoofing, a user datagram protocol (UDP) flood attack, a denial-of-service (DOS) attack, a deauthentication attack, a controller communication link eavesdropping attack, and a telemetry link spoofing or hijacking attack.

18. The drone hijacker/jammer system according to claim 16, wherein the detachable drone hijacker targets unmanned target vehicles that use one or both of frequency hopping spread spectrum (FHSS) and direct sequence spread spectrum (DSSS) modulation schemes.

19. A drone jammer system operatively associated with attacking unmanned target vehicles, the drone jammer system comprising:

a ground control station including one or more base antennas; and a plurality of portable detachable drone jammers operatively associated with a plurality of respective friendly unmanned vehicle, each detachable drone jammer comprising:

a mount to attach and detach the detachable drone jammer to a respective friendly unmanned vehicle, the mount adapted to attach and detach to a preconfigured mount operatively associated with the unmanned vehicle;

a receiving antenna to receive an instruction set for attacking an unmanned target vehicle and radio frequency links of interest associated with the unmanned target vehicle;

a transmitting antenna to transmit attack signals at the unmanned target vehicle;

a software defined radio to generate the attack signals that are compatible with the unmanned target vehicle; and a processor to control the software defined radio and the transmitting antenna to attack the radio frequency links used by the unmanned target vehicle according to the instruction set, wherein the detachable drone jammer is a discrete device mounted on a surface of the friendly unmanned vehicle and the detachable drone jammer is completely operationally independent from the operation of the friendly unmanned vehicle and any associated electronics to operate the unmanned vehicle.

20. The drone jammer system according to claim 19, wherein the detachable drone jammer attacks the radio frequency links on the unmanned target vehicle that control one or more of the target vehicle's telemetry, video, remote control, data transmission, and navigation.

21. The drone jammer system according to claim 19, wherein the detachable drone jammer implements and executes combinations or subsets of the following electronic attack techniques: Broadband noise jamming, Partial band noise jamming, Sweep jamming, Tone and/or multi-tone jamming, Pulse jamming, Follower jamming, and Protocol aware partial dwell jamming.

22. The drone jammer system according to claim 19, wherein the detachable drone jammer targets target vehicles that use one or both of frequency hopping spread spectrum (FHSS) and direct sequence spread spectrum (DSSS) modulation schemes.

* * * * *